United States Patent
Nomura et al.

(10) Patent No.: US 10,054,841 B2
(45) Date of Patent: Aug. 21, 2018

(54) OPTICAL DEVICE, LIDAR DEVICE AND IMAGING DEVICE

(71) Applicant: MITSUBISHI ELECTRIC CORPORATION, Chiyoda-ku (JP)

(72) Inventors: Hiromitsu Nomura, Chiyoda-ku (JP); Takuya Tsuji, Chiyoda-ku (JP); Taiji Harada, Chiyoda-ku (JP); Ken Ueda, Chiyoda-ku (JP); Youhei Yarimizu, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 283 days.

(21) Appl. No.: 14/780,347

(22) PCT Filed: Mar. 31, 2014

(86) PCT No.: PCT/JP2014/001873
§ 371 (c)(1),
(2) Date: Sep. 25, 2015

(87) PCT Pub. No.: WO2014/162720
PCT Pub. Date: Oct. 9, 2014

(65) Prior Publication Data
US 2016/0041452 A1 Feb. 11, 2016

(30) Foreign Application Priority Data
Apr. 1, 2013 (JP) .................................. 2013-076226

(51) Int. Cl.
*G03B 17/08* (2006.01)
*G03B 17/02* (2006.01)
(Continued)

(52) U.S. Cl.
CPC .............. *G03B 17/08* (2013.01); *G01F 1/661* (2013.01); *G01S 17/02* (2013.01); *G01S 17/88* (2013.01); *G02B 7/008* (2013.01); *G03B 17/02* (2013.01)

(58) Field of Classification Search
CPC ........ G01P 5/26; G01S 7/4812; G01S 7/4916; G01S 7/493; G01S 7/497; G01S 17/58; G01S 2007/4977
See application file for complete search history.

(56) References Cited

U.S. PATENT DOCUMENTS

| 4,414,576 A | 11/1983 | Randmae |
| 2007/0171396 A1 | 7/2007 | Harris et al. |

(Continued)

FOREIGN PATENT DOCUMENTS

| GB | 2481988 A | 1/2012 |
| JP | 5-68191 A | 3/1993 |

(Continued)

OTHER PUBLICATIONS

Partial Supplementary European Search Report dated Oct. 18, 2016 in Patent Application No. 14779650.2.

(Continued)

*Primary Examiner* — Luke D Ratcliffe
(74) *Attorney, Agent, or Firm* — Oblon, McClelland, Maier & Neustadt, L.L.P.

(57) ABSTRACT

An optical device includes: a casing having a waterproof structure; a light transmission part provided in the casing; an air blow port for blowing air onto the light transmission part; a flow path for causing the air to flow to the air blow port, the flow path being provided to maintain the waterproof structure of the casing; an air intake port through which the air flows into the flow path; a blower part generating the flow of the air from the air intake port to the air blow port; and (Continued)

an observation unit accommodated in the casing to receive light from the outside via the light transmission part.

20 Claims, 16 Drawing Sheets

(51) Int. Cl.
*G01F 1/66* (2006.01)
*G01S 17/02* (2006.01)
*G01S 17/88* (2006.01)
*G02B 7/00* (2006.01)

(56) References Cited

U.S. PATENT DOCUMENTS

| | | | | |
|---|---|---|---|---|
| 2008/0210881 | A1* | 9/2008 | Harris | G01S 17/95 250/393 |
| 2009/0134005 | A1* | 5/2009 | Sato | C10B 33/10 202/262 |
| 2009/0244363 | A1 | 10/2009 | Sugimura et al. | |
| 2011/0285984 | A1* | 11/2011 | Christian | G01P 5/26 356/28.5 |
| 2012/0062731 | A1 | 3/2012 | Enomoto et al. | |
| 2012/0092645 | A1 | 4/2012 | Inokuchi | |
| 2013/0062228 | A1 | 3/2013 | Danilov | |
| 2014/0192356 | A1 | 7/2014 | Antikainen et al. | |

FOREIGN PATENT DOCUMENTS

| | | |
|---|---|---|
| JP | 5-259673 A | 10/1993 |
| JP | 7-92538 A | 4/1995 |
| JP | 2000-171878 A | 6/2000 |
| JP | 2006-128749 A | 5/2006 |
| JP | 2007-225266 A | 9/2007 |
| JP | 2009-503486 A | 1/2008 |
| JP | 2010-2740 A | 1/2010 |
| JP | 2010-217077 A | 9/2010 |
| JP | 2011-214933 A | 10/2011 |
| WO | WO 2013/004893 A1 | 1/2013 |

OTHER PUBLICATIONS

Extended European Search Report dated Feb. 6, 2017 in Patent Application No. 14779650.2.
International Search Report dated Jul. 1, 2014 in PCT/JP2014/001873 filed Mar. 31, 2014.
Canadian Office Action dated Jul. 28, 2016 in Patent Application No. 2,908,021.

* cited by examiner

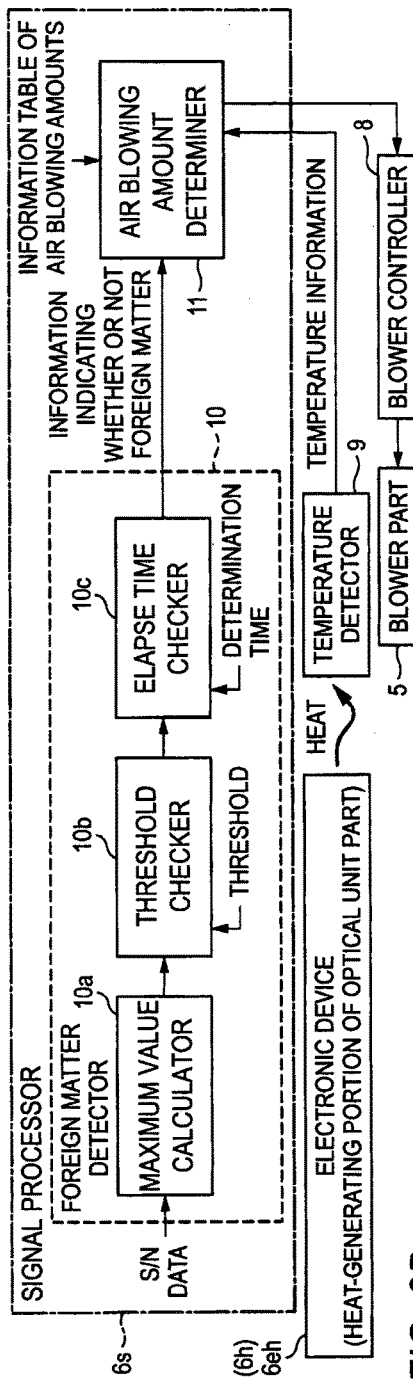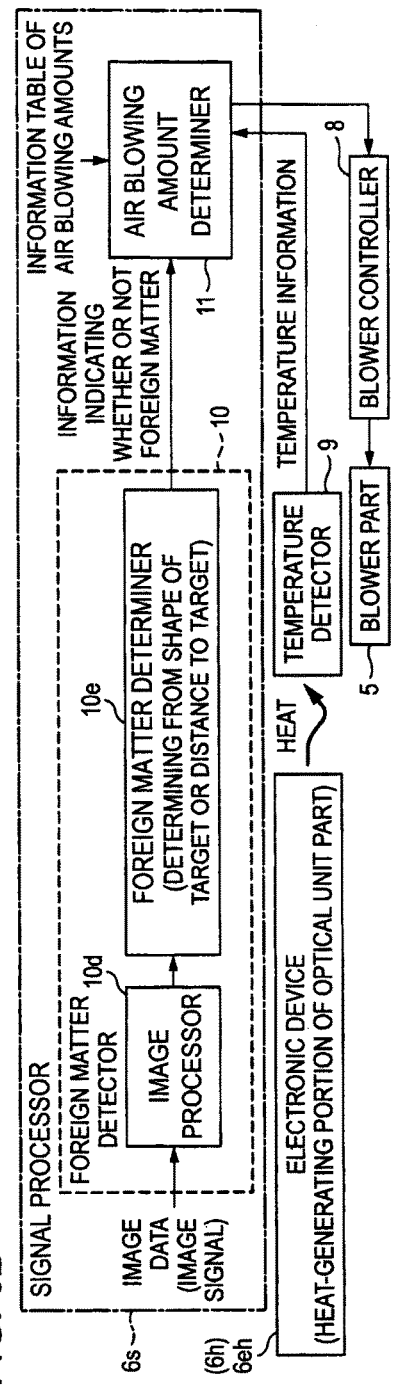

OPTICAL DEVICE, LIDAR DEVICE AND IMAGING DEVICE

TECHNICAL FIELD

The present disclosure relates to an optical device having a function of removing foreign matter on a light transmission member.

BACKGROUND ART

Conventionally, in an optical device having a function of removing foreign matter on a light transmission member, there is an optical device to clean the light transmission member (protection glass or glass) with a wiper (for example, refer to Patent Literature 1 or 2). Also, in an apparatus configured to remove the foreign matter on the light transmission member of the optical device or to prevent the foreign matter from being attached on the light transmission member, there is an apparatus to blow the wind (air) in a direction or in front of the light transmission member (front glass or window glass) (for example, refer to Patent Literature 3 or 4). In Patent Literature 3, the wind blowing to the light transmission member passes through a cooling fin. In the meantime, Patent Literature 5 discloses a cooling structure of an electronic device in which fins (cooling) for a pair of high heat generating electronic devices are provided in a flow path.

CITATION LIST

Patent Literature

[Patent Literature 1] Japanese Patent Application Publication No. H05-68191A (FIGS. 2 and 14)
[Patent Literature 2] Japanese Patent Application Publication No. H07-92538A (FIGS. 1 and 15)
[Patent Literature 3] Japanese Patent Application Publication No. 2000-171878A (FIG. 1)
[Patent Literature 4] Japanese Patent Application Publication No. 2010-2740A (FIGS. 2 to 4)
[Patent Literature 5] Japanese Patent Application Publication No. H05-259673A (FIGS. 1 and 2)

SUMMARY OF THE INVENTION

Technical Problem

However, since the wiper described in Patent Literatures 1 and 2 is provided in contact with the light transmission member, it cannot be applied to an optical device in which the periodic replacement of the light transmission member and the damage of the light transmission member are not permitted. Also, it has not been examined sufficiently to control optimally an air volume in the configuration of blowing the wind (air) to the light transmission member, as disclosed in Patent Literatures 3 and 4, or to apply the configuration to an optical device having a casing of a waterproof or airtight structure.

An object of the present disclosure is to provide an optical device, a lidar device and an imaging device that are applied easily in a case where a casing has a waterproof structure.

Solution to Problem

An optical device, a lidar device and an imaging device of the present disclosure includes a casing having a waterproof structure; a light transmission part provided on the casing; an air blow port to blow air to the light transmission part; a flow path through which the air flows to the air blow port and which is formed with maintaining the waterproof structure of the casing; an air intake port, through which the air flows into the flow path; a blower part to generate an air flow from the air intake port to the air blow port; and an observation unit accommodated in the casing and receiving light from an outside through the light transmission part.

Effects of the Invention

According to the present disclosure, it is possible to obtain the optical device, the lidar device and the imaging device capable of blowing the air onto the light transmission part of the casing having the waterproof structure.

BRIEF DESCRIPTION OF THE DRAWINGS

FIGS. 8A and 8B are functional block diagrams of main parts of the optical device according to the first illustrative embodiment of the present disclosure.

DETAILED DESCRIPTION OF ILLUSTRATIVE EMBODIMENTS

First Illustrative Embodiment

Hereinafter, a first illustrative embodiment of the present disclosure is described with reference to FIGS. 1 to 14. A structure of an optical device according to the first illustrative embodiment is described with reference to FIGS. 1 to 14, and air-blowing-amount control processing of the optical device according to the first illustrative embodiment, i.e., an air blowing method to a light transmission member is described with reference to FIGS. 5 to 14. The optical device is a lidar device, an imaging device and other device having a light transmission member. In this application, the 'air blowing' includes not only a configuration of blowing directly most of the air to a light transmission member (a light transmission part 3, which is described later) but also a configuration of causing the air to flow to a periphery of the light transmission member so that foreign matter such as water droplet and/or dust attached on a surface of the light transmission member can be blown out.

(1) Structure of Optical Device

Figure 1A:
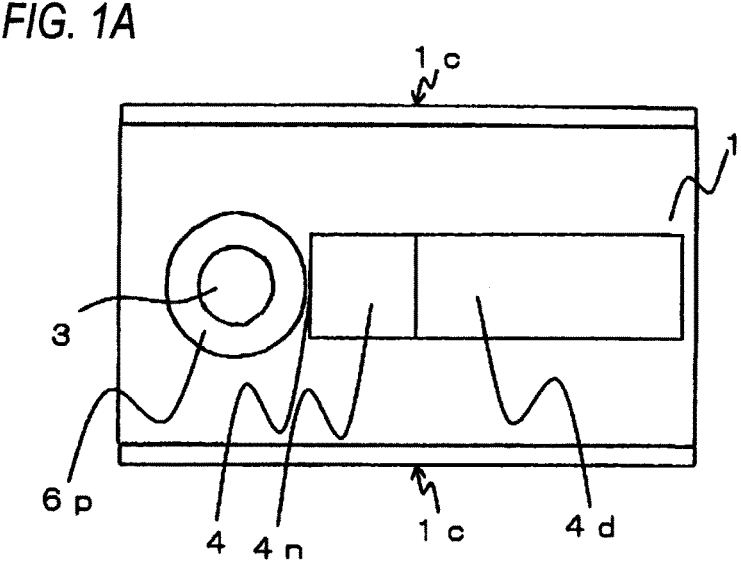
FIGS. 1A and 1B are configuration views (a plan view, a cross-sectional view) of an optical device according to a first illustrative embodiment of the present disclosure.
Figure 1B:
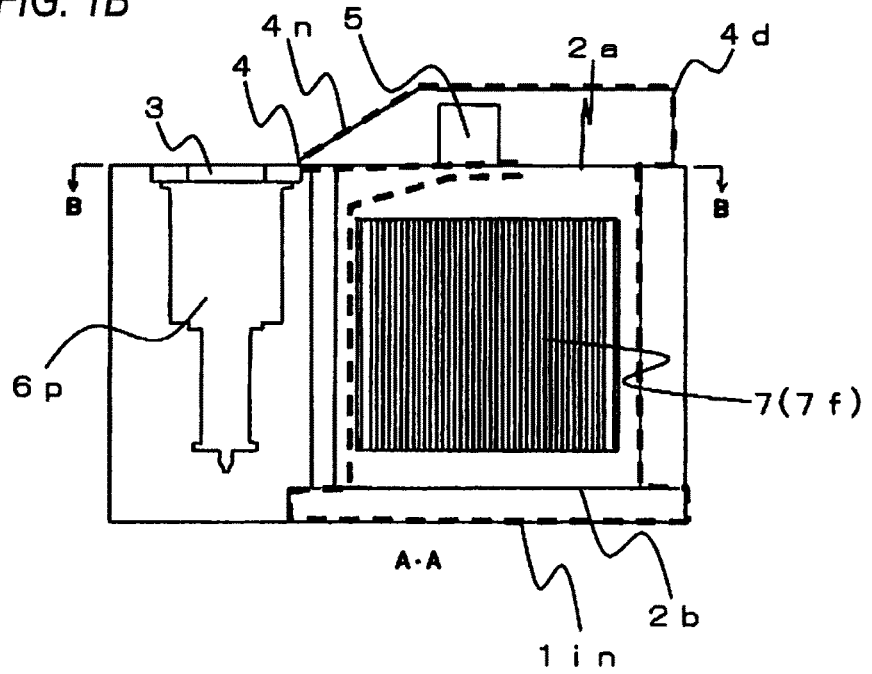
Figure 2A:
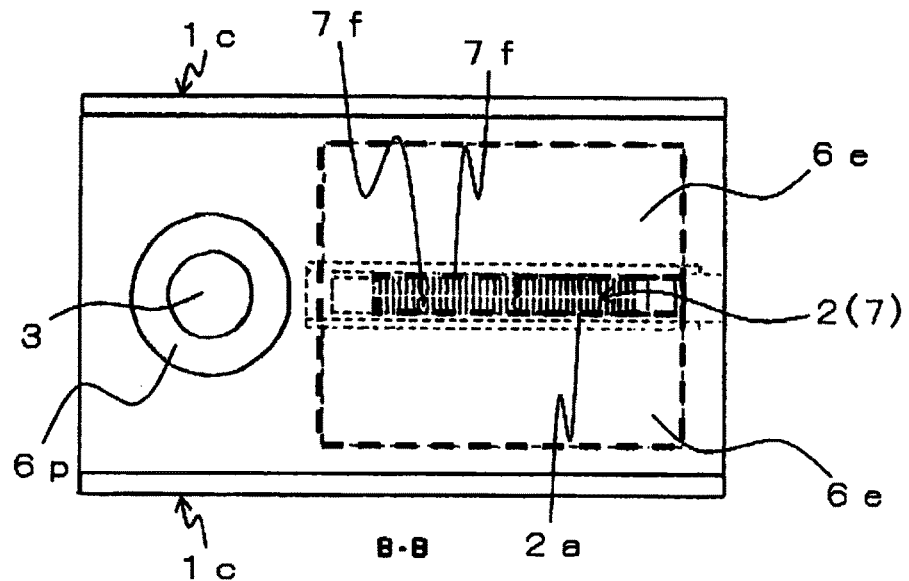
FIGS. 2A and 2B are configuration views (a cross-sectional view, a side perspective view) of the optical device according to the first illustrative embodiment of the present disclosure.
Figure 2B:
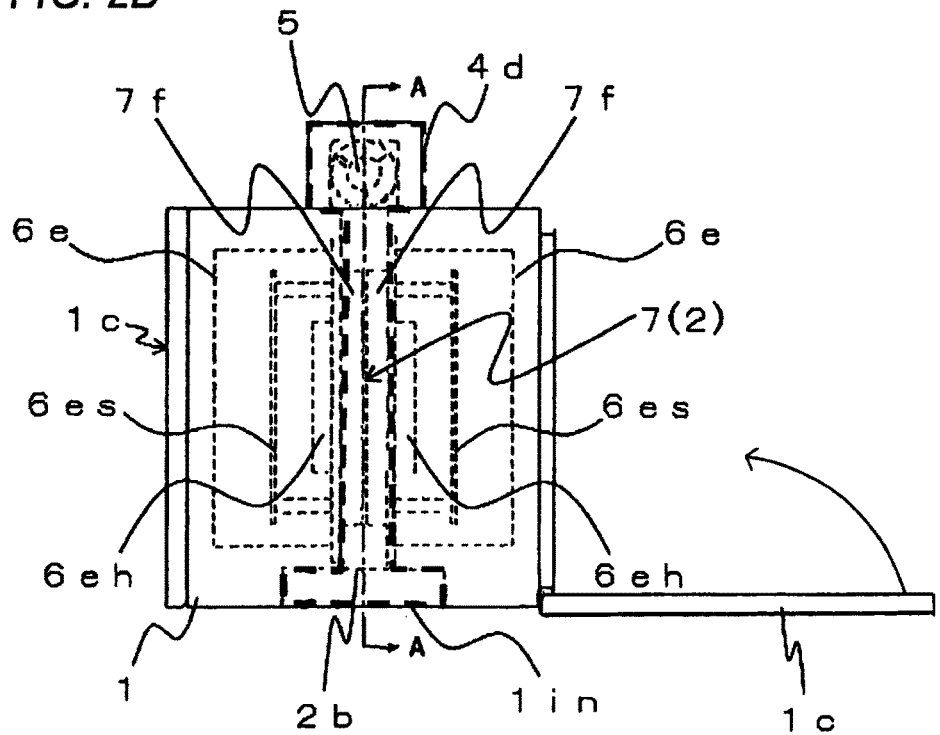
Figure 3:
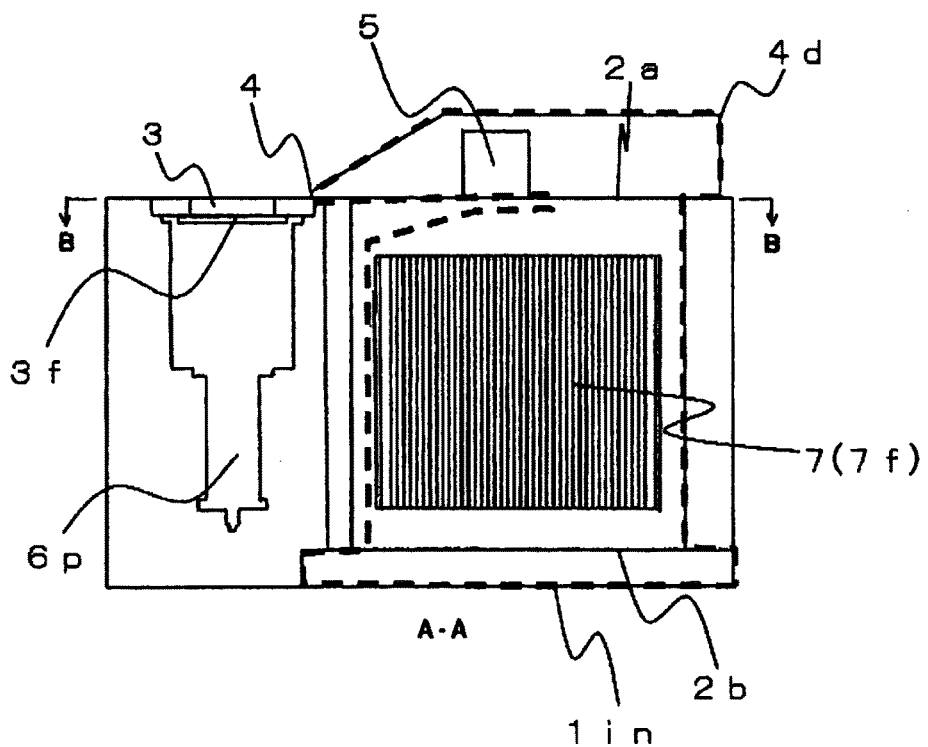
FIG. 3 is a cross-sectional view of the optical device according to the first illustrative embodiment of the present disclosure, in which a film heater is provided.
Figure 4A:
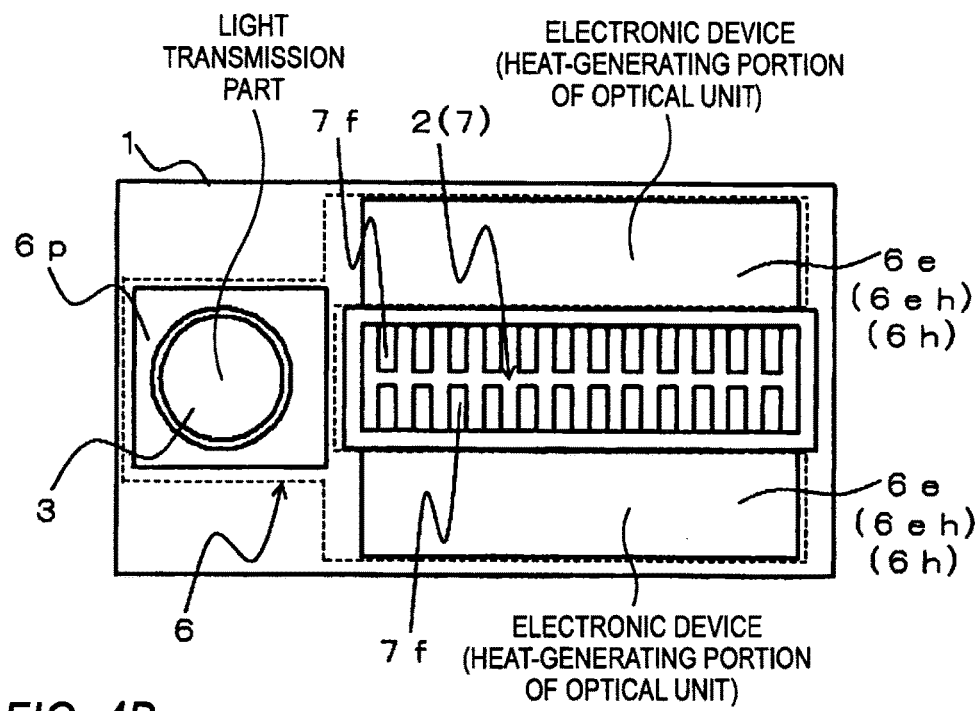
FIGS. 4A and 4B are schematic cross-sectional views of the optical device according to the first illustrative embodiment of the present disclosure.
Figure 4B:
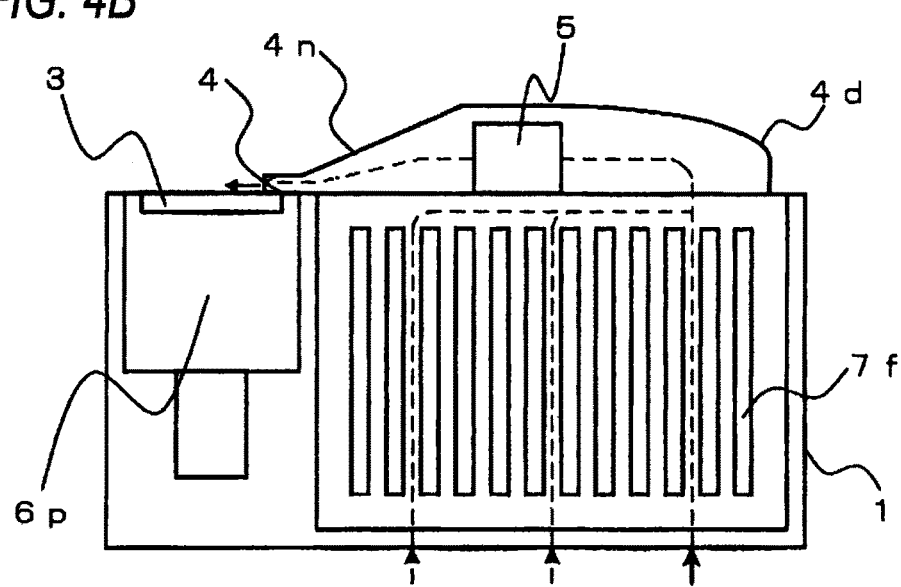

FIG. 1 composed of FIGS. 1A and 1B is a configuration view (a plan view, a cross-sectional view) of an optical device according to a first illustrative embodiment of the present disclosure. FIG. 2 composed of FIGS. 2A and 2B is a configuration view (a cross-sectional view, a side perspective view) of the optical device according to the first illustrative embodiment of the present disclosure. FIG. 3 is a cross-sectional view of the optical device according to the first illustrative embodiment of the present disclosure, in which a film heater is provided. FIG. 4 composed of FIGS. 4A and 4B is a schematic cross-sectional view of the optical device according to the first illustrative embodiment of the present disclosure.

FIG. 1A is a plan view of the optical device, FIG. 1B is a cross-sectional view of the optical device along a line A-A of FIG. 2B, FIG. 2A is a cross-sectional view of the optical device along a line B-B of FIG. 1B, and FIG. 2B is a side perspective view of the optical device, as seen from a short side. FIG. 3 is a cross-sectional view of the optical device having a film heater configured to heat a light transmission member, and is equivalent to the cross-sectional view of the optical device along a line A-A of FIG. 2B. FIG. 4A is a schematic cross-sectional view of the optical device, and is equivalent to a cross-sectional view at a slightly lower position than the cross-sectional view of the optical device along a line B-B of FIG. 1B. FIG. 4B is a schematic cross-sectional view of the optical device, and is equivalent to the cross-sectional view of the optical device along a line A-A of FIG. 2B.

In FIGS. 1 to 4, a casing 1 has a cuboid box-shaped outer shape, and has at least a waterproof structure and also an airtight structure in some cases. The water proof structure or airtight structure is referred to as a waterproof/airtight structure. In the meantime, the airtight structure is also the waterproof structure. A through flow path 2 is a conduit for ventilation formed to penetrate the casing 1 and surrounded in four directions thereof by the waterproof/airtight structure of the casing 1. A light transmission part 3 is made of a material through which the light can transmit, such as a lens, a transparent plate and the like of glass or resin, and is provided on the casing 1. The light transmission part 3 is provided on the casing 1 so that the optical device can transmit or receive the light for observation and the like. For this reason, the light transmission part 3 is also referred to as an observation window. The through flow path 2 is a part of a passage configured to cool heat generated from an optical unit and to enable the air, which is to blow to the light transmission part 3, to pass therethrough. An exit port-side of the through flow path 2 is provided with a nozzle opening 4, which is an air blow port. The nozzle opening 4 is to blow the air so as to blow out the foreign matter attached on the light transmission part 3. Specifically, the nozzle opening 4 is an opening formed at a nozzle-shaped tip, and can accelerate the exhaust air (air) from the through flow path 2 and blow the exhaust air to the light transmission part 3.

In the meantime, an opening 2a that is a first opening of the through flow path 2 formed on a first surface (upper surface) on which the light transmission part 3 is provided, is configured to communicate with the nozzle opening 4, and a second opening that is the other opening of the through flow path 2 formed on a second surface (lower surface) that is a surface of the casing 1 facing the first surface, is an air intake port 1in. The opening 2a of the through flow path 2 is formed on the upper surface of the casing, and the air intake port 1in of the through flow path 2 is formed on the lower surface of the casing. The upper surface of the casing is provided with a duct 4d configured to cover the opening 2a of the through flow path 2. The light transmission part 3 side of the duct 4d is provided with a nozzle 4n of which cross-sectional area is reduced gradually as it becomes closer to the light transmission part 3. An opening formed at a tip of the nozzle 4n is the nozzle opening 4. The through flow path 2 and the duct 4d are a flow path for causing the air to flow to the nozzle opening 4 that is an air blow port. The air is introduced into the flow path from the air intake port 1in, and the air is enabled to blow to the light transmission part 3 from the nozzle opening 4. Although described in detail later, the flow path is formed with maintaining the waterproof structure of the casing 1. The flow path is a part shown with the thick broken line in FIGS. 1B, 2B and 3. In FIG. 4B, the broken line having an arrow at the starting point indicates a flow of the air.

A film heater 3f shown in FIG. 3 is to heat the light transmission part 3 so that the snow or ice is not attached on the light transmission part 3.

In FIGS. 1 to 4, a side of the casing 1 is provided with a cover 1c. The cover 1c may be provided on both facing sides of the casing 1, on four sides or on one or three sides thereof, and it may be provided on one or both of the upper and lower surfaces with providing the cover on the side or without providing the cover on the side. In this application, a case where the covers 1c are provided on both long sides is shown mainly. In a case where the covers 1c are closed, the covers 1c are fitted in a frame body of the casing. At least one of the frame body of the casing and the covers 1c is provided with a packing. Thus, in a case where the covers 1c are closed, the casing 1 has the waterproof/airtight structure. Also, as shown in FIG. 2B, in a case where the cover 1c is opened, a person can reach the observation unit 6 or heat-generating portions 6h of the observation unit 6, so that it is possible to repair the optical device. The cover 1c may be provided also on an electronic device casing 6e (which is described later). That is, the casing 1 and the electronic device casing 6e have the door-type cover 1c for maintenance or repair, respectively, and the cover 1c is provided with the rubber or silicon packing, so that the airtight structure can be made.

In FIGS. 1 to 4, the through flow path 2 starting from the air intake port 1in formed on the lower surface of the casing 1 has a cross-sectional area substantially perpendicular to the flowing direction of the air, which is reduced at a cross-sectional area reduction part 2b, as compared to an opening area of the air intake port 1in. A filter may be provided in the air intake port 1in. The opening area of the air intake port 1in may be made to be the same as the cross-sectional area of the through flow path 2 of a part at which a cooler 7 (which is described later) is provided, without forming the cross-sectional area reduction part 2b. A blower part 5, which is a fan or blower, is to generate a flow of the air from the air intake port 1in to the nozzle opening 4. The blower part 5 is provided in the duct 4d. When the air is introduced into the duct 4d, the air having passed through the through flow path 2 is changed a flowing direction thereof to a substantial right angle, as shown in the figure. The air having changed the flowing direction is blown from the nozzle opening 4 to the light transmission part 3. It is possible to cause easily the direction of the air flowing in the flow path to face towards the light transmission part 3 by the duct 4d. Also, the blower part 5 is arranged in a space inside the duct 4d, so that it is possible to save the space. In a case where the blower part 5 is arranged at the opening 2a, it is also possible to save the space. The blower part 5 may also be arranged at the air intake port 1in, at an outside of the air intake port 1in or at an outside of the casing 1, or in the through flow path 2.

In FIGS. 1 to 4, the observation unit 6 is accommodated in the casing 1, is configured to receive the light from the outside through the light transmission part 3 and is a part configured to execute signal processing in a lidar device such as a Doppler lidar and an imaging device such as a camera. Also, the observation unit 6 has an optical unit casing 6p configured to house therein an optical unit of the optical device and electronic device casings 6e configured to house therein an electronic device of the optical device. The optical unit casing 6p is provided with the light transmission part 3. Also, a surface of the optical unit casing 6p on which the light transmission part 3 is provided is exposed from the casing 1. That is, the surface of the optical unit casing 6p on which the light transmission part 3 is provided is a part of an outer surface of the casing 1. For this reason, it can be said that the light transmission part 3 is provided on the casing 1. In this application, the arrangement where the two electronic device casings 6e are arranged vertically to the one optical unit casing 6p as viewed in the plan view and to face each other to form the through flow path 2, through which the cooling air flows, therebetween, i.e., the Π (pi)-shaped arrangement is shown in the figures. The optical unit casing 6p and the electronic device casings 6e may be formed integrally.

The cooler 7 is to cool the heat-generating portions 6h of the observation unit 6 by fins 7f, which is made of aluminum and arranged in the through flow path 2. The fins 7f to which the heat is transferred from the heat-generating portions 6h of the observation unit 6 are configured to radiate the heat to the air flowing through the through flow path 2, thereby cooling the heat-generating portions 6h. The heat-generating portions 6h and the fins 7f are connected so that a thermal resistance between the heat-generating portions 6h and the fins 7f becomes as small as possible. The heat-generating portions 6h and the fins 7f may be connected by a heat pipe configured to transfer the heat by a coolant. A part of the heat-generating portion 6h of the observation unit 6, which is provided at the electronic device casing 6e, is referred to as a heat-generating member 6eh.

Figure 5A:
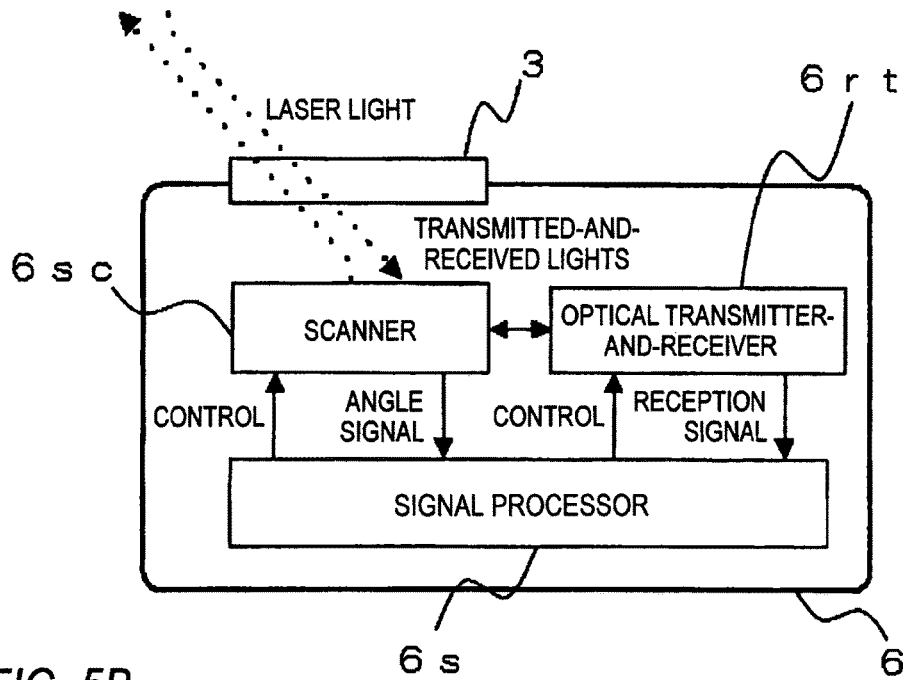
FIGS. 5A and 5B are functional block diagrams of a light transmission part and an observation unit of the optical device according to the first illustrative embodiment of the present disclosure.
Figure 5B:
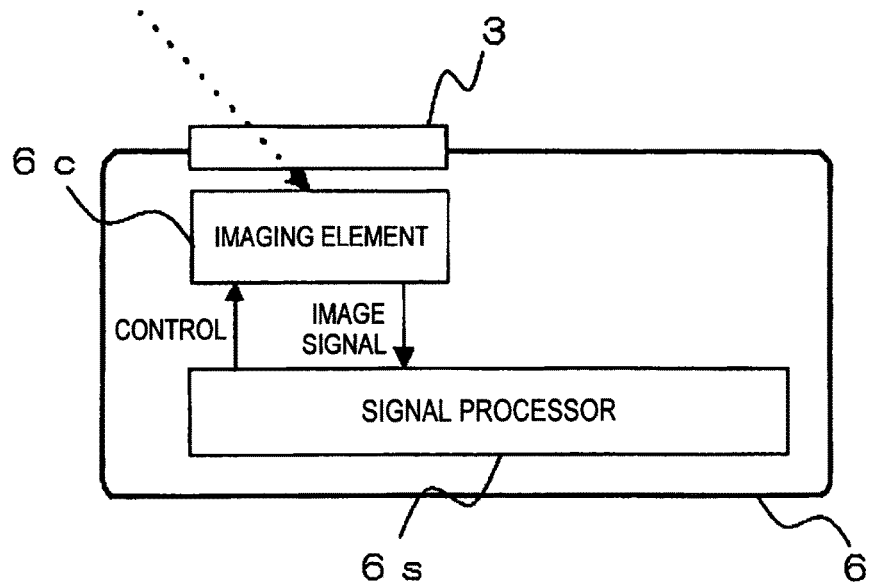
Figure 6:
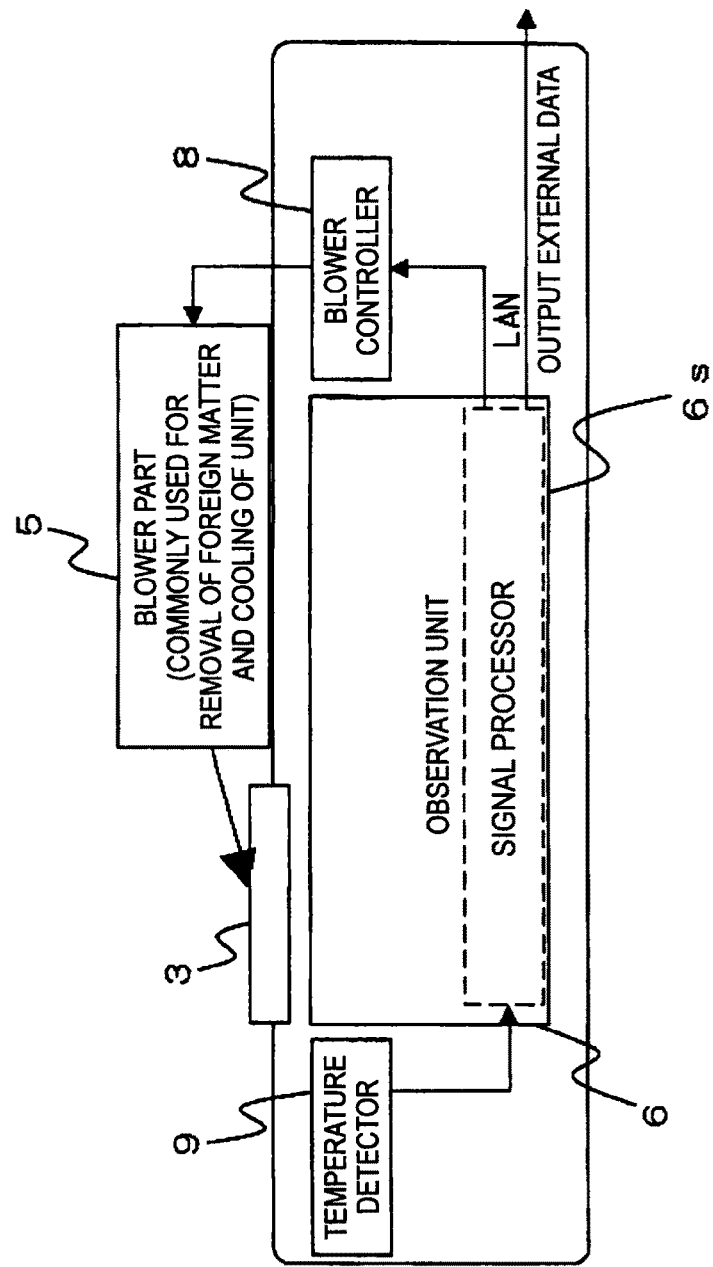
FIG. 6 is a functional block diagram of the optical device according to the first illustrative embodiment of the present disclosure.

FIG. 5 composed of FIGS. 5A and 5B is a functional block diagram of the light transmission part and the observation unit of the optical device according to the first illustrative embodiment of the present disclosure. FIG. 5A is a functional block diagram in a case where the optical device is a lidar device, and FIG. 5B is a functional block diagram in a case where the optical device is an imaging device. FIG. 6 is a functional block diagram of the optical device according to the first illustrative embodiment of the present disclosure.

In FIG. 5, an imaging element 6c of the imaging device is a camera module consisting of an optical sensor such as a charge coupled device (CCD) or complementary metal oxide semiconductor (CMOS). A signal processor 6s is to execute signal processing for an image signal obtained by the imaging element 6c.

In FIGS. 1 to 6, the observation unit 6 is accommodated in the casing 1, is to receive the light from the outside through the light transmission part 3 and is a lidar device such as a Doppler lidar or an imaging device such as a camera. In a case where the optical device is a lidar device, the observation unit 6 has a scanner 6sc, an optical transmitter-and-receiver 6rt and a signal processor 6s. In a case where the optical device is an imaging device, the observation unit 6 has an imaging element 6c and a signal processor 6s. In FIG. 5, the scanner 6sc of the lidar device is configured to irradiate the outside with a transmission light and to receive a reflected light, which is formed as the irradiated transmission light is reflected on the aerosol that is a fine particle in the air. The optical transmitter-and-receiver 6rt is configured to execute transmission and reception processing for the transmission light that is to be transmitted by the scanner 6sc, and the reflected light that is received by the scanner 6sc. The signal processor 6s is configured to calculate a wind speed from a received signal of the reflected light received and processed by the optical transmitter-and-receiver 6rt and an angle signal of the scanner 6sc.

In FIGS. 1 to 6, the optical unit casing 6p is embedded in the casing 1. In a case where the optical device is the lidar device, the scanner 6sc and the optical transmitter-and-receiver 6rt are accommodated in the optical unit casing 6p. In a case where the optical device is the imaging device, the imaging element 6c is accommodated in the optical unit casing 6p. A part or all of the signal processor 6s may be accommodated in the optical unit casing 6p. The electronic device casings 6e are embedded in the casing 1, and the signal processor 6s of the observation unit 6 is accommodated mainly therein. A part of the scanner 6sc and optical transmitter-and-receiver 6rt of the lidar device or the imaging element 6c of the imaging device may be accommodated in the electronic device casing 6e. In a case where the optical unit casing 6p and the electronic device casings 6e are formed integrally, the scanner 6sc and optical transmitter-and-receiver 6rt of the lidar device or the imaging element 6c and signal processor 6s of the imaging device are accommodated therein. Also, the optical unit casing 6p and the electronic device casings 6e are arranged around the through flow path 2. The heat-generating member 6eh of the electronic device casing 6e is an electronic device circuit. The heat-generating member 6eh is also referred to as an electronic device circuit 6eh. An electronic device substrate 6es and the electronic device circuit 6eh are accommodated in the electronic device casing 6e and function mainly as the signal processor 6s.

Here, the electronic device circuit 6*eh* may be the entire heat-generating portion 6*h* of the observation unit 6 or may be a part of the heat-generating portion 6*h* of the observation unit 6. In a case where the electronic device circuit is a part of the heat-generating portion, the scanner 6*sc* and optical transmitter-and-receiver 6*rt* of the lidar device or the imaging element 6*c* of the imaging device in the optical unit casing 6*p* may be a part of the heat-generating portion 6*h* of the observation unit 6. The electronic device circuit 6*eh* from which a large amount of heat is generated is arranged in the vicinity of the cooler 7 as close as possible.

There is a certain degree of freedom regarding how to arrange the heat-generating portion 6*h* of the observation unit 6 in the casing 1. It is determined what a ratio the heat-generating portions 6*h* are distributed in the optical unit casing 6*p* and the electronic device casings 6*e* so that the heat can be transferred effectively to the fins 7*f* from the heat-generating portions 6*h* and so that an arrangement is suitable for the optical device.

Subsequently, a specific configuration of the optical device according to the first illustrative embodiment is described with reference to FIGS. 1 to 4. In the optical device, the heat-generating portion 6*h* is arranged inside of a wall surface surrounding the through flow path 2 from four directions in the waterproof/airtight structure of the casing 1. The heat-generating portion 6*h* is a member that is arranged in either or both of the optical unit casing 6*p* and electronic device casings 6*e* accommodated in the casing 1 and generates the heat as the optical device operates. The optical device is arranged so that the generated heat is transferred easily to the fins 7*f*, and can exhaust the heat transferred from the heat-generating portions 6*h* through the fins 7*f* by causing the air to flow through the through flow path 2.

The optical device is configured to guide the exhaust air (air) having cooled the fins 7*f* to the duct 4*d*, to accelerate the air at the nozzle 4*n* provided on the duct 4*d* and to discharge the accelerated air to the light transmission part 3. In this way, by using the kinetic energy of the exhaust air flow for the cleaning of the light transmission part 3, the power saving and making the optical device compact can be realized by sharing the function and the optical device can be used sustainably. The exhaust air is discharged onto the light transmission part 3 through the duct 4*d*. The air introduced from the air intake port 1*in* is accelerated to the speed based on the Bernoulli's theorem because the flow path cross-sectional area is reduced at the nozzle 4*n*. The accelerated air can blow out the foreign matter such as water droplets resulting from rain and snow and dust on the light transmission part 3 by an exhaust air stream, so that it is possible to clean the light transmission part 3 without using a person's hand.

The electronic device casing 6*e* having all or most of the heat-generating portion 6*h* of the observation unit 6 is arranged to be inside of the wall surface or to configure a part of the wall surface surrounding the through flow path 2 from four directions in the waterproof/airtight structure. In particular, as shown in FIGS. 1 and 2, the electronic device casing 6*e*, which is the main heat-generating portion 6*h* of the observation unit 6, is arranged to be a part of the wall surface of the through flow path 2 in the waterproof/airtight structure. Specifically, as shown in FIG. 2A, the through flow path 2 has a rectangular cross-section along a B-B line, and a wall surface of the through flow path 2 of a long side of the rectangle is an outer surface of the electronic device casing 6*e* on which the fins 7*f* are provided. Also, in this application, since the two electronic device casings 6*e* are provided, it can be said that the through flow path 2 (the cooler 7) is arranged between the two electronic device casings 6*e*.

The optical unit casing 6*p* having a part of the heat-generating portion 6*h* of the observation unit 6 is arranged to be inside of the wall surface or to configure a part of the wall surface surrounding the through flow path 2 from four directions in the waterproof/airtight structure. In particular, as shown in FIGS. 1 and 2, the optical unit casing 6*p* having a main part of the heat-generating portion 6*h* of the observation unit 6 is arranged around the through flow path 2 in the waterproof/airtight structure. Specifically, as shown in FIG. 2A, a cross-section along a B-B line of the through flow path 2 has a rectangular shape, and the optical unit casing 6*p* having a main part of the heat-generating portion 6*h* of the observation unit 6 is arranged at a short side of the rectangle.

An outer surface of the optical unit casing 6*p* and/or the electronic device casing 6*e* may be configured as a part of the wall surface surrounding the through flow path 2 from four directions in the waterproof/airtight structure of the casing 1. That is, the outer surface of the optical unit casing 6*p* and/or the electronic device casing 6*e* is exposed from the casing 1. It is also possible to arrange the surface, on which the fins 7*f* of the electronic device substrate 6*es* are provided, on the exposed outer surface. The high heat-generating element (CPU (Central Processing Unit), GPU (Graphic Processing Unit), high output amplifier) configuring the heat-generating member 6*eh* is arranged in the electronic device casing 6*e*. That is, the fins 7*f* of a heat sink to which fins of the heat-generating member 6*eh* are attached are arranged in the through flow path 2.

In a case where the outer surface of the optical unit casing 6*p* and/or the electronic device casing 6*e* is exposed from the casing 1, since the optical unit casing 6*p* and/or the electronic device casing 6*e* is fitted into the frame body of the casing 1, it is necessary to secure the air-tightness of the corresponding part by a packing and the like. It is possible to reduce the thermal resistance between the fins 7*f* and the heat-generating member 6*eh* which generates a larger amount of heat than an optical unit in the optical unit casing 6*p*. That is, the electronic device substrate 6*es* having the heat-generating member 6*eh* mounted thereon configures a part of the wall surface of the through flow path 2 while maintaining the waterproof structure of the casing 1.

In the drawings of this application, the two electronic device casings 6*e* and the two fins 7*f* are provided. However, the electronic device casing 6*e* may be divided into three or more casings. Because of such reason that the heat-generating bodies 6*eh* are divided partially, a plurality of fins 7*f* may be divided and attached to the electronic device substrates 6*es* or electronic device circuits 6*eh*. In a case where the electronic device casing 6*e* is divided into several casings or the heat-generating member 6*eh* is provided at multiple places for weight saving, space saving and the like, the plurality of fins 7*f*, divided into parts, is arranged to perform the cooling effectively. In a case where the fins 7*f* are divided and arranged concentrically at necessary places, the cooling effect of the fins 7*f* can be improved. Thereby, it is possible to exhaust effectively the heat from the electronic device casings 6*e* and to save the weights of the fins 7*f* and the electronic device casings 6*e*.

According to the optical device of the first illustrative embodiment, the optical device and the electronic device circuit 6*eh* (the signal processing unit), which have a higher output and are required to exhaust more heat than the optical unit in the optical unit casing 6*p*, can be arranged easily as the one electronic device casings 6*e* in the casing 1. Therefore, the inside of the casing 1 and the hollow structure (through flow path 2) including the air intake port 1in through which the external air passes are separated. The through flow path 2 is a part of the flow path passing through an interior side of the outer shape of the casing 1 and is formed to maintain the waterproof structure of the casing 1. For this reason, it is possible to implement the effective heat exhaust in the waterproof/airtight structure and the continuous operation while protecting the electronic device casings 6e required to have the waterproof/airtight structure.

In a case where the optical device of the first illustrative embodiment operates continuously, it is specifically necessary to exhaust the heat generated from the optical unit casing 6p and the electronic device casings 6e in the optical device, which are used for control of the device and the sensor, data processing, optical processing and the like, for example. Regarding the heat generated in the casing 1, the heat that is generated from the heat-generating member 6eh (for example, a high heat-generating electronic device such as a CPU, a GPU and a high output amplifier) on the electronic device substrate 6es in the electronic device casing 6e becomes high. In use of the high heat-generating electronic device, there is a precondition to cool forcibly the high heat-generating electronic device. In the casing 1 having the waterproof/airtight structure, since it is not possible to introduce the external air, it is not possible to perform the forcible cooling by a common method. In the optical device of the first illustrative embodiment, the fins 7f are exposed to the hollow space formed in the casing 1, i.e., the through flow path 2, so that the heat can be exhausted from the inside of the casing 1 towards the external air.

In the meantime, the through flow path 2 used for ventilation has the openings (i.e., the opening 2a and the air intake port 1in) on the two opposite sides, i.e., the upper and lower sides of the casing 1 having the cuboid outer shape and the waterproof/airtight structure, and is a hollow structure that penetrates the casing 1 and is surrounded by the waterproof/airtight structure. The through flow path 2 has a rectangular cross-sectional shape in a direction substantially perpendicular to the flowing direction of the air. Also, as shown in FIGS. 1B, 2, 3 and 4, the fins 7f of the cooler 7 extend from the long facing sides of the rectangular cross-sectional shape of the through flow path 2 in the B-B cross-section of FIG. 2A, respectively. The heat-generating portion 6h and the fin 7f may be provided on only one side of the long sides.

As shown in FIGS. 1 to 4, since the light transmission part 3 is provided on the optical unit casing 6p (the casing 1), it is provided at the short side of the rectangular cross-sectional shape of the through flow path 2. The casing 1 has the cuboid outer shape, and the light transmission part 3 and the one opening of the through flow path 2 are arranged on the same surface. The through flow path 2 has the one opening 2a and the air intake port 1in that is the other opening of the through flow path 2 respectively on the opposing surfaces (upper and lower surfaces) of the casing 1. An area of the opening 2a is smaller than a cross-sectional area of the through flow path 2 of the part at which the fin 7f of the cooler 7 is provided. The duct 4d covering the entire opening 2a and becoming a flow path from the opening 2a to the nozzle opening 4 adjacent to the light transmission part 3 is attached to the casing 1. Inside of the duct 4d, the blower part 5 is arranged between the opening 2a and the nozzle opening 4.

As shown in FIGS. 1 to 4, the blower part 5 is placed on the surface of the casing 1, on which the light transmission part 3 and the opening 2a are arranged, but may be provided at the duct 4d. The duct 4d has the nozzle 4n of which cross-sectional area is reduced as proceeding toward the nozzle opening 4. Particularly, FIGS. 1 to 4 shows that the cross-sectional area of the nozzle 4n is reduced as proceeding toward the nozzle opening 4 at a part from the blower part 5 towards the nozzle opening 4. In the meantime, the nozzle may be provided at the opening (2a) side to the blower part 5.

As shown in FIG. 3, the optical device may be provided with the film heater 3f attached to the light transmission part 3. The film heater 3f is configured to generate heat to melt the snow and/or ice on the light transmission part 3. The water droplets, which are formed as the ice on the light transmission part 3 and are melted, may be blown out by the air blown from the nozzle opening 4. The signal processor 6s controls whether to turn on or off the film heater 3f. The film heater 3f is ON (activated) or OFF (stopped) by measuring an external air temperature outside the casing 1. That is, a temperature detector configured to measure the external air temperature is provided on the optical device. The film heater 3f is arranged between the light transmission part 3 and the optical unit in the optical unit casing 6p, so that it is possible to prevent the light transmission part 3 from being frozen or dew drop from being formed thereon under low-temperature environments in the winter season by the film heater 3f without influencing an observation result of the optical device, thereby performing the continuous observation by the optical device.

In this way, according to the optical device of the first illustrative embodiment, the air is introduced by the blower part 5 from the air intake port 1in, which is an external intake port of the casing 1, and passes through the hollow structure having the fins 7f therein, so that the heat from the fins 7f is exhausted. Thereby, the heat can be exhausted from the inside of the casing 1 while the external air is not introduced into the casing 1. Also, it is possible to use the exhaust air, used for the heat exhaust, for cleaning the light transmission part 3, and to save the power and to reduce the number of components by sharing the function of the blower part 5.

The waterproof/airtight structure of the casing 1 is configured to have the hollow structure as shown with the thick broken line in FIG. 2B in the outer shape of the casing 1 and can be divided into the inside of the casing 1 and a hollow pipe-line part through which the external air flows. The external air introduced from the air intake port 1in by the operation of the blower part 5 passes through the hollow pipe-line part, which is the through flow path 2, without passing through the interior side of the casing 1 and is blown to the light transmission part 3 directly. Therefore, the casing 1 of the optical device has the structure where the water and the air are not introduced into the casing 1 from the outside. That is, the waterproof/airtight structure can be obtained.

For example, as for the lidar device being a measuring device using a laser light or the imaging device being an optical device such as a camera, when it is effective to arrange the light transmission part 3 at a central side of the casing 1 with considering the mounting of the casing 1, the light transmission part 3 is arranged at the central side of the casing 1 and the hollow structure (through flow path 2) is arranged at some place where the optical unit casing 6p or the electronic device casing 6e is arranged in the drawings of this application. Thereby, it is possible to implement the optical device according to the first illustrative embodiment. In other words, in the drawings of this application, the casing 1 has the cuboid outer shape, the light transmission part 3 and the opening 2a are arranged on the same surface, and the opening 2a is arranged to be closer to the central side than the light transmission part 3, as viewed from plan view of the surface on which the light transmission part 3 and the opening 2a are arranged. That is, the opening 2a is arranged to be closer to the central side than the light transmission part 3 on the planar surface on which the light transmission part 3 and the opening 2a are arranged. That is, it may be possible that the casing 1 has the cuboid outer shape, the light transmission part 3 and the opening 2a are arranged on the same surface, and the opening 2a is arranged to be closer to the central side than the light transmission part 3, as viewed from plan view of the surface on which the light transmission part 3 and the opening 2a are arranged. In the meantime, the direction 'viewing from plan view of the surface on which the light transmission part 3 and the opening 2a are arranged' is the same direction as the flowing direction of the air in the through flow path 2, strictly speaking, the direction from the air intake port 1in towards the opening 2a.

Also, the optical device may be configured to transfer the heat of the heat-generating member 6eh by a heat pipe arranged between the heat-generating member 6eh in the electronic device casing 6e and the fin 7f. The heat exhaust of the electronic device casing 6e is implemented by the heat transfer between the heat-generating member 6eh and the fin 7f and the heat transfer between the fin 7f and the external air. Thus, it is required that the heat-generating member 6eh and the fin abut to each other with a thermal sheet having good thermal conductivity being interposed therebetween. However, in a case where the heat pipe is used, it is possible to transfer the heat from the heat-generating member 6eh to the fin 7f and it is not required to abut to the heat-generating member 6eh and the fin 7f each other, so that the degree of freedom of the substrate structure of the electronic device substrate 6es increases. Also, the heat pipe is arranged between the heat-generating member 6eh in the electronic device casing 6e and the fin 7f, so that the casing 1 can be arranged between the electronic device casing 6e and the through flow path 2. Also, since the restriction on a layout of the electronic device substrate 6es are reduced by using the heat pipe, the degree of freedom of the arrangement of the heat-generating member 6eh on the electronic device substrate 6es is increased.

In the drawings of this application, the light transmission part 3 and the opening 2a are arranged on one surface of the casing 1 having the cuboid outer shape, and the duct 4d is placed on the surface on which the light transmission part 3 and the opening 2a are arranged. Most part of the duct 4d may be accommodated in the casing 1, and the upper surface of the duct 4d may be configured to be substantially flush with the light transmission part 3. To this end, a recess portion configured to accommodate therein the most part of the duct 4d is formed on the surface on which the light transmission part 3 is arranged. The opening 2a is formed on a bottom of the recess portion, and the light transmission part 3 is provided adjacent to the recess portion. Only the nozzle opening 4 may be configured to protrude slightly from the planar surface on which the light transmission part 3 is arranged. In this casing, an incline of the nozzle 4n, of which the cross-sectional area is reduced as proceeding toward the nozzle opening 4, is formed at lower side than a plane of the upper side of the casing 1 in the drawings of this application. Also, the inclined part may be formed at both of facing upper and lower parts of the nozzle 4n. This can also be applied in a case where the duct 4d is placed on the surface on which the light transmission part 3 and the opening 2a are arranged, as shown in the drawings of this application.

(2) Air-Blowing-Amount Control Processing

Subsequently, air-blowing-amount control processing of the optical device according to the first illustrative embodiment is described with reference to FIGS. 5 to 14. The air-blowing-amount control processing is to perform a method of blowing the air to the light transmission member. The method of blowing air to the light transmission member is also referred to as the air blowing method.

Figure 7:
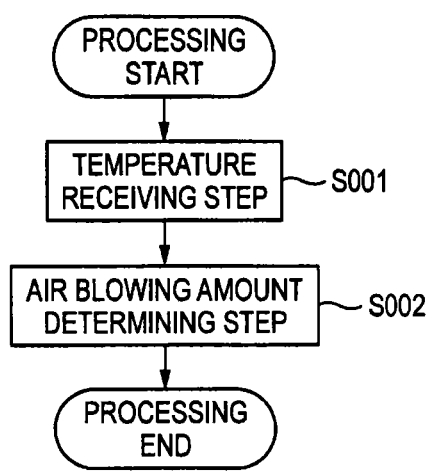
FIG. 7 is a flowchart of air-blowing-amount control processing of the optical device according to the first illustrative embodiment of the present disclosure.
Figure 9:
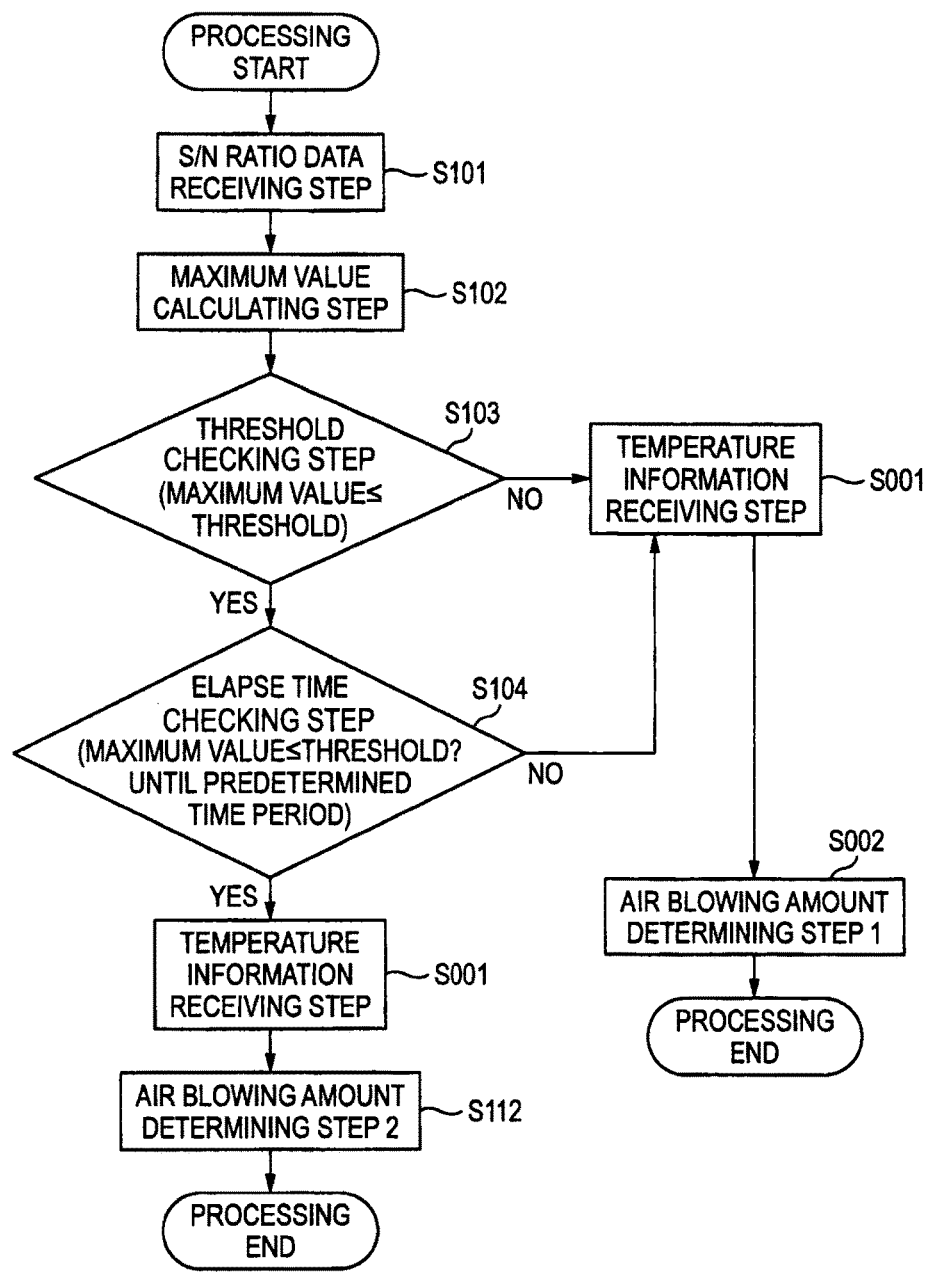
FIG. 9 is a flowchart of the air-blowing-amount control processing of the optical device according to the first illustrative embodiment of the present disclosure.
Figure 10A:
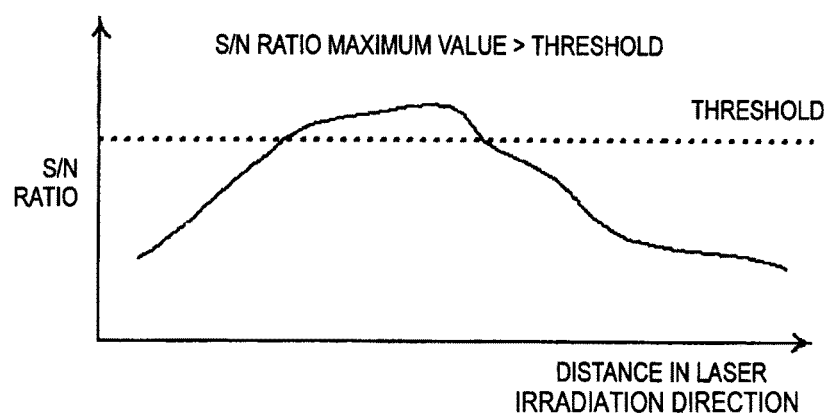
FIGS. 10A and 10B are graphs showing a maximum value of an S/N ratio for each distance in a laser irradiation direction of a lidar device according to the first illustrative embodiment of the present disclosure.
Figure 10B:
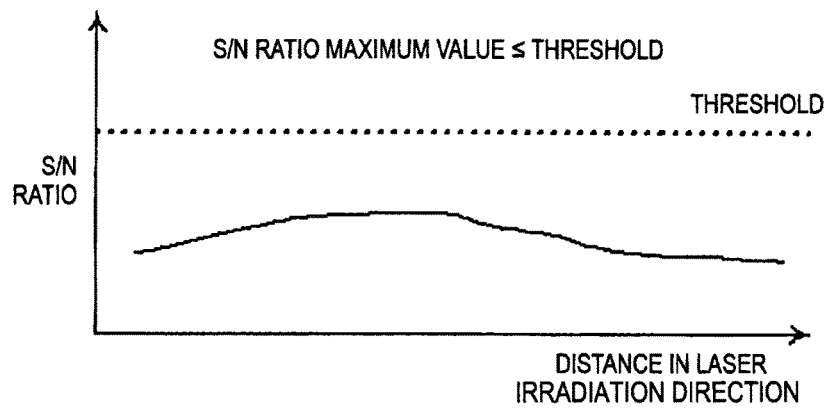
Figure 11A:
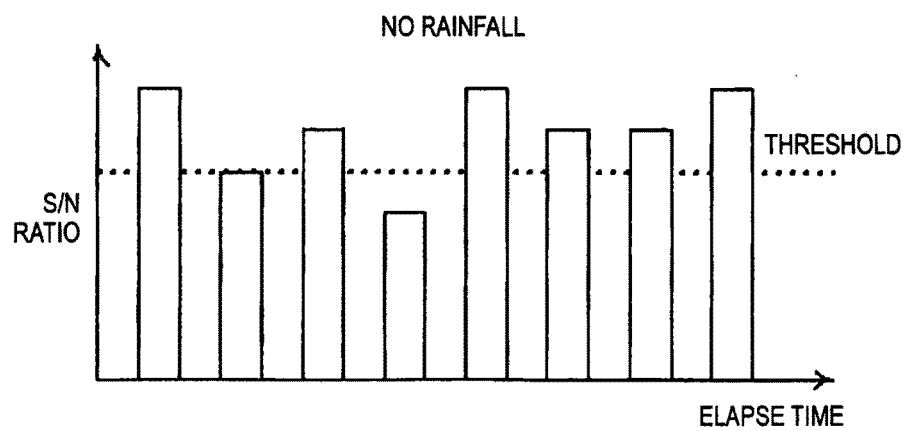
FIGS. 11A and 11B are graphs showing a maximum value of the S/N ratio for each elapse time of the lidar device according to the first illustrative embodiment of the present disclosure.
Figure 11B:
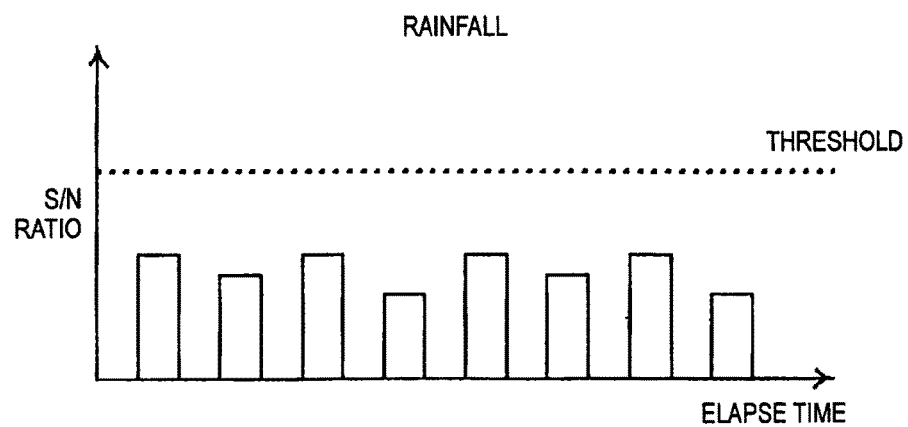
Figure 12:
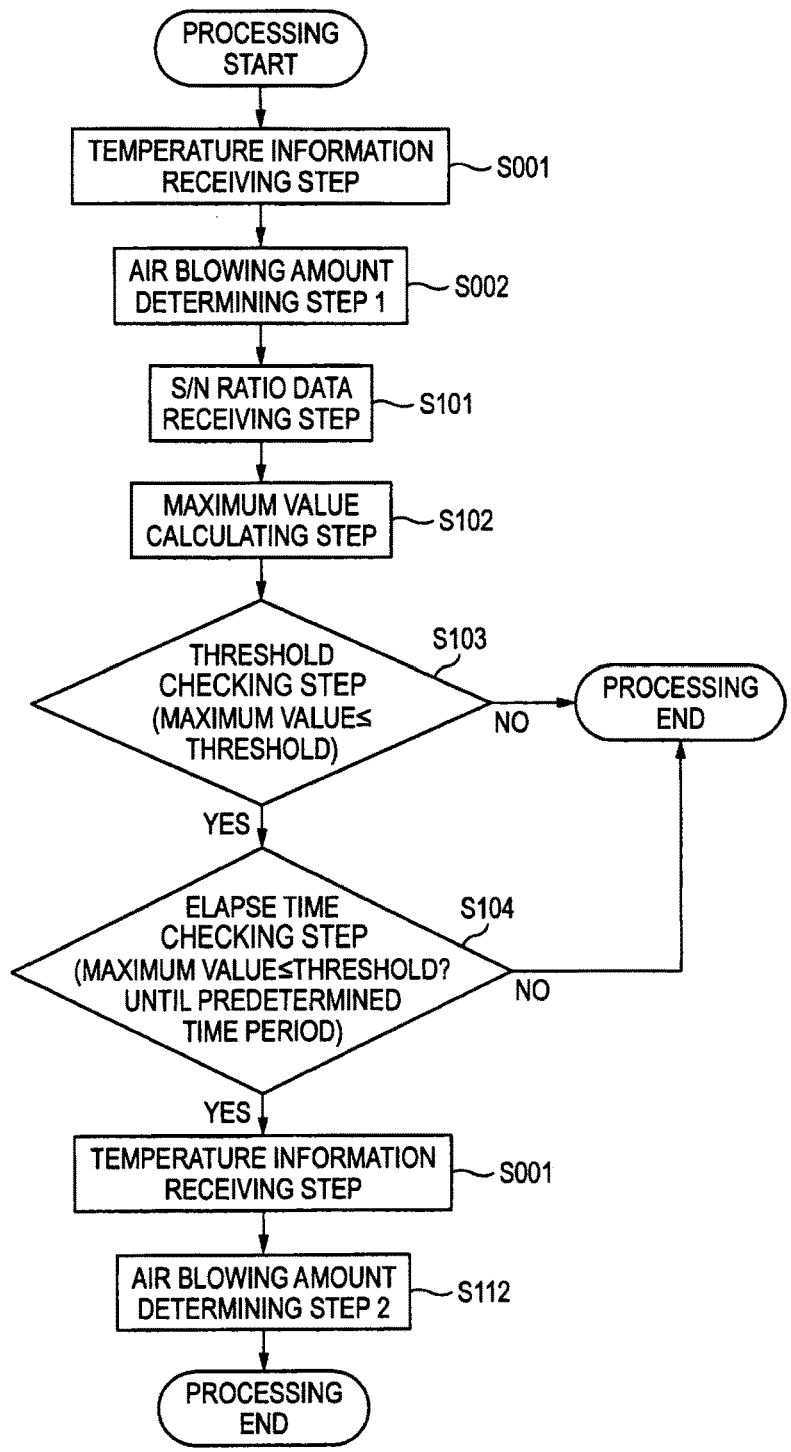
FIG. 12 is a flowchart of the air-blowing-amount control processing of the optical device according to the first illustrative embodiment of the present disclosure.
Figure 13:
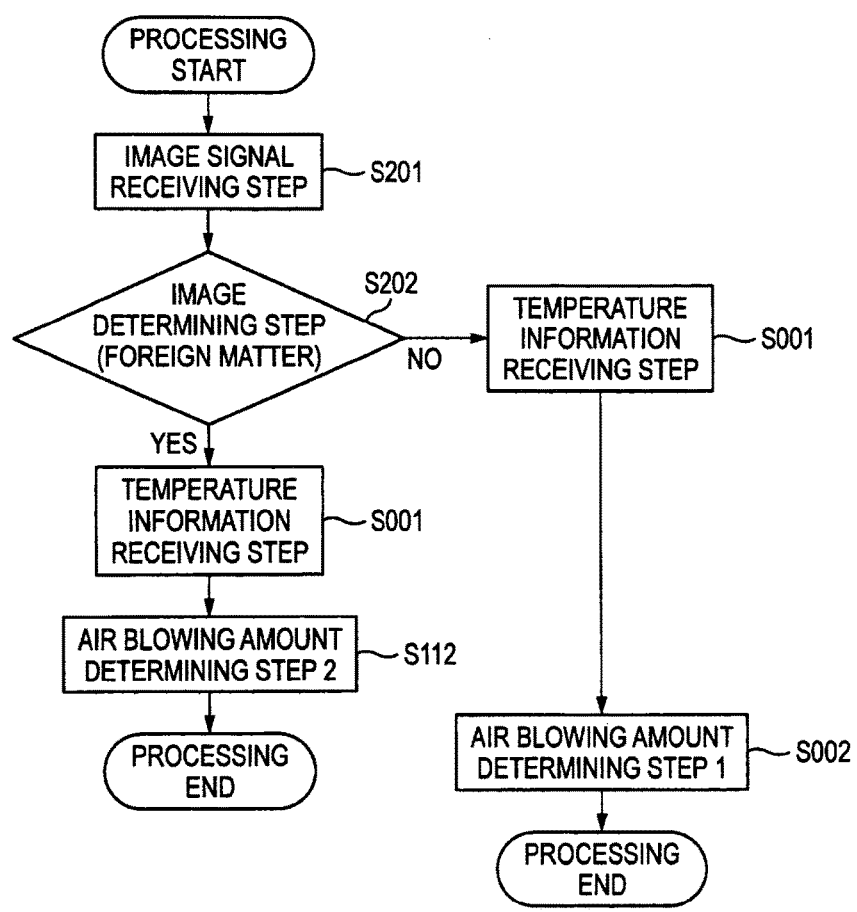
FIG. 13 is a flowchart of the air-blowing-amount control processing of the optical device according to the first illustrative embodiment of the present disclosure.
Figure 14:
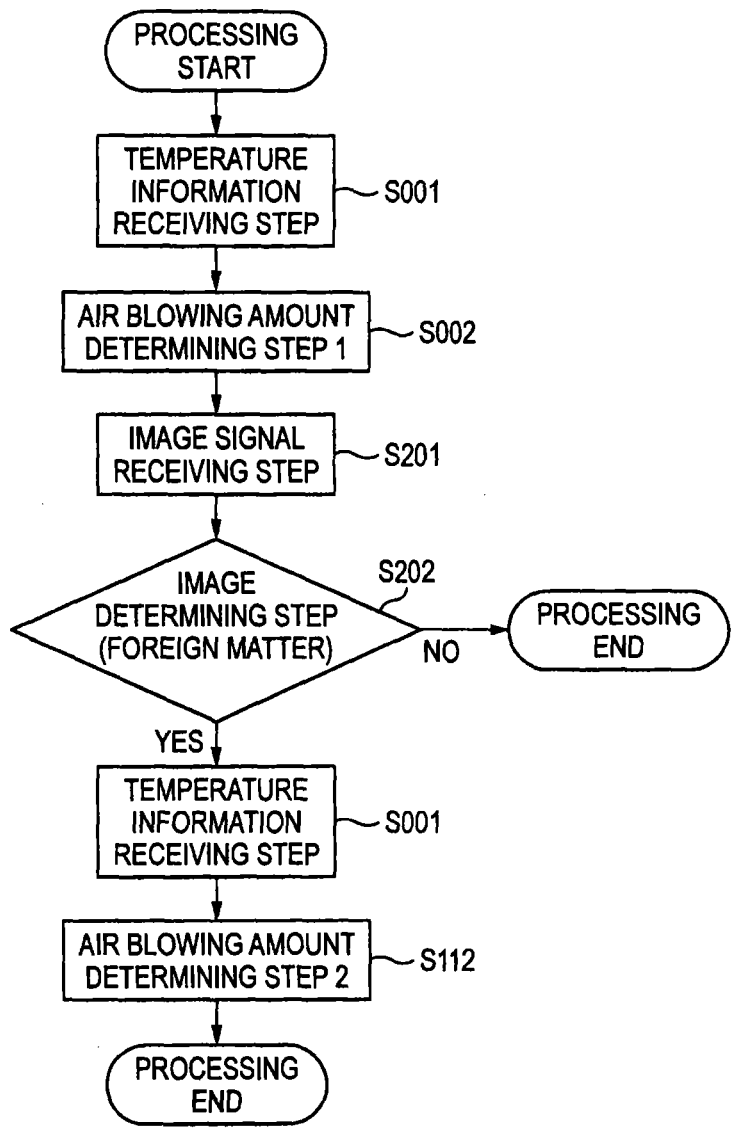
FIG. 14 is a flowchart of the air-blowing-amount control processing of the optical device according to the first illustrative embodiment of the present disclosure.

FIG. 7 is a flowchart of the air-blowing-amount control processing of the optical device according to the first illustrative embodiment of the present disclosure. FIG. 8 composed of FIGS. 8A and 8B is a functional block diagram of main parts of the optical device according to the first illustrative embodiment of the present disclosure. FIG. 9 is a flowchart of the air-blowing-amount control processing of the optical device according to the first illustrative embodiment of the present disclosure. FIG. 10 composed of FIGS. 10A and 10B is a graph showing a maximum value of an S/N ratio for each distance in a laser irradiation direction of a lidar device according to the first illustrative embodiment of the present disclosure. FIG. 11 composed of FIGS. 11A and 11B is a graph showing a maximum value of the S/N ratio for each elapse time of the lidar device according to the first illustrative embodiment of the present disclosure. FIG. 12 is a flowchart of the air-blowing-amount control processing of the optical device according to the first illustrative embodiment of the present disclosure. FIG. 13 is a flowchart of the air-blowing-amount control processing of the optical device according to the first illustrative embodiment of the present disclosure. FIG. 14 is a flowchart of the air-blowing-amount control processing of the optical device according to the first illustrative embodiment of the present disclosure.

FIG. 5A is a functional block diagram of the optical device, which is a lidar device, and FIG. 5B is a functional block diagram of the optical device, which is an imaging device.

FIG. 8A is a functional block diagram of main parts of the lidar device, and FIG. 8B is a functional block diagram of main parts of the imaging device. FIG. 10A is a graph showing a maximum value of an S/N ratio for each distance in a laser irradiation direction in a case where the maximum value exceeds a threshold. FIG. 10B is a graph showing a maximum value of an S/N ratio for each distance in a laser irradiation direction in a case where the maximum value does not exceed the threshold. FIG. 11A is a graph showing a maximum value of the S/N ratio for each elapse time in a case where the maximum value exceeds a threshold. FIG. 11B is a graph showing a maximum value of the S/N ratio for each elapse time in a case where the maximum value does not exceed the threshold. A reference numeral 'S' denoted in FIGS. 7, 9, 12, 13 and 14 is an initial letter of STEP indicating a processing step.

Here, the S/N ratio is a value obtained by dividing a signal level S by a noise level N. The S/N ratio is also referred to as an S/N value, S/N data, and S/N ratio data. A maximum value of the S/N ratio for certain time period is referred to as an S/N ratio maximum value. The S/N ratio maximum value is also referred to as a maximum S/N ratio and a maximum S/N value.

In FIGS. 5, 6 and 8, a blower controller 8 is configured to instruct the blower part 5 about an air blowing amount that is an amount of the air flowing in the through flow path 2. The blower part 5 is configured to generate an air flow from the air intake port 1in towards the nozzle opening 4 in the flow path formed between the air intake port 1in and the nozzle opening 4 configured to blow the air to the light transmission part 3. A temperature detector 9 is configured to detect a temperature of the heat-generating portion 6h of the observation unit 6. A foreign matter detector 10 provided on the signal processor 6s is configured to detect the foreign matter such as water droplet and/or dust attached on the light transmission part 3. In detail, the foreign matter detector 10 is configured to detect the foreign matter attached on the light transmission part 3 from the light incident to the observation unit 6 from the outside through the light transmission part 3. Specifically, by using the information of the light as an image, it detects the foreign matter on the light transmission part 3 from a shape of an object, a distance from an object, for example, a distance from the light transmission part 3 or a distance from the imaging element 6c and/or changing in an information signal of light.

In FIGS. 5, 6 and 8, in a case where the foreign matter detector 10 detects the foreign matter, an air-blowing-amount determiner 11 provided on the signal processor 6s compares a cooling corresponding air blowing amount that is a preset air blowing amount of the blower part 5 for each temperature corresponding to a temperature detected by the temperature detector 9 and a foreign-matter-removing air blowing amount that is a preset air blowing amount of the blower part 5 upon detection of foreign matter corresponding to a case where the foreign matter detector 10 detects the foreign matter and sends a comparison result of the air blowing amount to the blower controller 8 so that the blower part 5 operates with a larger amount of air blowing. The air-blowing-amount determiner 11 is configured to acquire an information table of air blowing amounts from the signal processor 6s or the outside and to use the information table for determination. The information table of air blowing amounts includes a table for cooling the heat-generating portion 6h and a table for removing the foreign matter such as water droplet and/or dust attached on the light transmission part 3. In this application, the foreign matter detector 10 and the air-blowing-amount determiner 11 are provided on the signal processor 6s. However, at least one of the foreign matter detector 10 and the air-blowing-amount determiner 11 may be provided at an outside of the signal processor 6s. Also, in this application, the blower controller 8 is provided at the outside of the signal processor 6s. However, the blower controller 8 may be provided in the signal processor 6s.

In a case of a configuration where the optical device is the lidar device is described with reference to FIG. 5A. As shown in FIG. 5A, the lidar device has the scanner 6sc configured to irradiate the outside with a transmission light and to receive a reflected light, where the irradiated transmission light is reflected on the aerosol, through the light transmission part 3, the optical transmitter-and-receiver 6rt configured to execute transmission and reception processing for the transmission light transmitted by the scanner 6sc and the reflected light received by the scanner 6sc, respectively, and the signal processor 6s configured to calculate a wind speed based on a frequency change due to the Doppler effect, with a received signal of the reflected light received and processed by the optical transmitter-and-receiver 6rt and an angle signal of the scanner 6sc. The signal processor 6s is configured to control the scanner 6sc and the optical transmitter-and-receiver 6rt. Also, the signal processor 6s is configured to output the calculated wind speed and acquired data to the outside through an interface with the outside such as a local area network (LAN) (external data). The foreign matter detector 10 has a maximum value calculator 10a, a threshold checker 10b and an elapse time checker 10c.

A principle of measuring atmosphere with the lidar device (Doppler lidar) is described. The Doppler lidar is configured by the light transmission part 3 through which the laser light is emitted, the scanner 6sc, the observation unit 6, and the signal processor 6s. In the case of the lidar device, the light transmission part 3 is also referred to as a laser emission window. In the Doppler lidar configured in this way, a reflected wave of the light, which is emitted from the scanner 6sc to the air through the light transmission part 3 (a contact surface with the atmosphere), is again received by the scanner 6sc, and the received light is amplified and frequency converted into a reception IF (intermediate frequency) signal by the optical transmitter-and-receiver 6rt. The IF signal is subject to A/D (analog-digital) conversion and frequency analysis processing in the signal processor 6s, so that spectrum data is calculated, a wind speed vector is calculated from the spectrum data and the calculated wind speed is displayed and recorded.

In a case where the optical device is the lidar device, the foreign matter detector 10 detects that the foreign matter is attached on the light transmission part 3, when the maximum S/N ratio of the received signal within a time period of a predetermined length is smaller than a predetermined threshold. In the meantime, while the foreign matter detector 10 detects that the foreign matter is attached on the light transmission part 3, by processing the calculated wind speed as a reference value, an error of the wind speed detection resulting from the attachment of the foreign matter on the light transmission part 3 can be excluded easily.

Meanwhile, in a case of a configuration where the optical device is the imaging device is described with reference to FIG. 5B. As shown in FIG. 5B, the imaging device has the imaging element 6c and the signal processor 6s configured to perform the signal processing for an image signal obtained by the imaging element 6c. The signal processor 6s is configured to control the imaging element 6c. Also, the signal processor 6s is configured to output the acquired image data and/or motion picture image data to the outside through an interface with the outside such as LAN (external data). In this case, the foreign matter detector 10 is configured to detect the foreign matter from the image signal signal-processed by the signal processor 6s. The foreign matter detector 10 has an image processor 10d and a foreign matter determiner 10e. That is, the foreign matter determiner 10e is configured to calculate a shape of an object and a distance of the object, for example, a distance from the light transmission part 3 or a distance from the imaging element 6c, from the image information based on the image signal signal-processed by the image processor 10d, and to determine whether the foreign matter is attached on the light transmission part 3.

The observation unit 6 is accommodated in the casing 1, and the light transmission part 3 is provided on the casing 1. This includes a case where the light transmission part 3 is provided on the optical unit casing 6p, the surface of the optical unit casing 6p on which the light transmission part 3 is provided is exposed from the casing 1 and constitutes the outer surface of the casing 1.

The optical device shown in FIG. 6 is applied with the air blowing method generating an air flow for cooling the heat-generating portion 6h of the observation unit 6, to which the light from the light transmission part 3 to which the light is incident from the outside is irradiated, by the blower part 5 and generating an air flow to the nozzle opening 4 configured to blow the air to the light transmission part 3 by the blower part 5.

A basic operation of cooling the heat-generating portion 6h of the observation unit 6 shown in FIG. 6 is shown in a flowchart of FIG. 7. First, in S001, a temperature detecting step (temperature information receiving step) of detecting a temperature of the heat-generating portion 6h of the observation unit 6 is performed. In S002, a blower control step of causing the blower part 5 to blow the air with a preset air blowing amount of the blower part 5 for each temperature in accordance with the temperature detected in the temperature detecting step is performed. Specifically, the signal processor 6s acquires the temperature of the heat-generating portion 6h of the observation unit 6 from the temperature detector 9, selects the preset air blowing amount of the blower part 5 at the acquired temperature, and sends the corresponding information to the blower controller 8, and the blower controller 8 controls the air blowing amount of the blower part 5. The blower controller 8 also controls whether to turn on (activate) or off (stop) the blower part 5.

In a case where the temperature of the heat-generating portion 6h is a temperature at which the cooling is not required, the blower part 5 is stopped. In a case where a previous state is a stop state, the stop state continues. That is, the blower part is not activated. Therefore, the preset air blowing amount of the blower part 5 for each temperature includes an air blowing amount of zero. Also, the preset air blowing amount of the blower part 5 for each temperature may be set so that as the temperature of the heat-generating portion 6h of the observation unit 6 increases, the air blowing amount increases gradually or so that a temperature range is divided and the air blowing amount increases in a stepwise. The information of the air blowing amounts, i.e., the preset air blowing amount of the blower part 5 for each temperature corresponds to a table for cooling the heat-generating portion 6h. The processing steps of S001 and S002 may be executed repeatedly or in a case where the temperature obtained in S001 changes from the previous state, the processing may proceed to S002.

In FIG. 8, the foreign matter detector 10 and the air-blowing-amount determiner 11 are provided on the signal processor 6s. The optical device is configured to use the blower part 5 commonly for cooling the heat-generating portion 6h of the observation unit 6 and removing the foreign matter such as water droplet and/or dust attached on the light transmission part 3. Therefore, in a case where the blower part 5 generates an air blowing amount required to blow out the foreign matter at a state where the foreign matter is not attached on the light transmission part 3 and the air blowing amount exceeds an air blowing amount required to cool the heat-generating portion 6h of the observation unit 6, the power is wasted. Therefore, it is important to control the air blowing amount of the blower part 5, depending on whether the foreign matter is attached on the light transmission part 3.

Specifically, in a case where the foreign matter is detected in a foreign matter detecting step of determining whether the foreign matter is attached on the light transmission part 3 by the foreign matter detector 10, an air blowing amount determining step of comparing a preset air blowing amount of the blower part 5 for each temperature corresponding to the temperature detected in the temperature detecting step and a preset air blowing amount of the blower part 5 upon detection of foreign matter corresponding to a case where the foreign matter is detected in the foreign matter detecting step and determining the larger air blowing amount is executed. In the meantime, the execution sequence of the foreign matter detecting step (S101 to S104 in FIGS. 9 and 12, S201 and S202 in FIGS. 13 and 14) and the temperature detecting step (S001) is not important. For example, some of the steps may be executed at the same time. Also, the foreign matter detecting step is to detect the foreign matter attached on the light transmission part 3 from the information about the light incident to the observation unit 6 from the outside through the light transmission part 3.

The blower controller 8 receives an instruction from the air-blowing-amount determiner 11 and executes a blower control step of causing the blower part 5 to blow the air with the air blowing amount that is determined as the larger air blowing amount in the air blowing amount determining step. The preset air blowing amount of the blower part 5 upon detection of foreign matter means an air blowing amount capable of blowing out the foreign matter attached on the light transmission part 3. The corresponding air blowing amount may be fixed to one air blowing amount or may be varied depending on a type (water droplet or dust) or amount of the detected foreign matter. In this case, in a case where an amount of the foreign matter is large or the foreign matter is the water droplet of which mass is heavy, it is considered to increase the air blowing amount, for example. The information of the air blowing amounts, i.e., the preset air blowing amount of the blower part 5 upon detection of foreign matter corresponds to a table for removing the foreign matter such as water droplet and/or dust attached on the light transmission part 3.

(A) Operations in a Case where Optical Device is Lidar Device

First, a case where the optical device is the lidar device is described with reference to FIGS. 8A and 9 to 12. In the case of the lidar device, it is detected in the foreign matter detecting step that the foreign matter is attached on the light transmission part 3 in a case where the maximum S/N ratio of the received signal, which is obtained by reception-processing the reflected light reflected on the aerosol, within a predetermined time period is smaller than a predetermined threshold. That is, the foreign matter is detected using the phenomenon that the S/N ratio is decreased due to the foreign matter. Here, an example where the foreign matter is the water droplet is described. The signal processor 6s of the lidar device is configured to detect whether the water droplet is attached on the light transmission part 3, based on the received signal output from the observation unit 6. In a case where there is no water droplet, the fan is controlled by the basic operation shown in FIG. 7 so that an optimal air blowing amount is generated on the basis of the temperature information output from the temperature detector 9. In a case where there is the water droplet, the blower part 5 is controlled with the wind speed capable of removing the water droplet.

The lidar device has a mechanism configured to remove the water droplet attached on the light transmission part 3 by the wind used for cooling the heat-generating portion 6h of the observation unit 6. The electronic device casings 6e having the mechanism of the fins 7f are fitted to the frames of both sides of the central hollow space of the casing 1, so that a space, i.e., the through flow path 2 is formed between the two electronic device casings 6e. The air taken by the blower part 5 is enabled to flow into the space and the heat is radiated from the fins 7f connected to the heat-generating portions 6h, so that the heat-generating portions 6h are cooled. Also, the wind speed of the received air is increased by reducing the cross-sectional area of the nozzle opening 4 and the air is blown to the light transmission part 3, so that the water droplet, the snow and the like can be removed.

The operations of cooling the heat-generating portion 6h of the observation unit 6 and removing the foreign matter on the light transmission part 3 are shown in a flowchart of FIG. 9. First, the received signal received from the optical transmitter-and-receiver 6rt is input to the maximum value calculator 10*a*, and the maximum value calculator 10*a* calculates a maximum value of the S/N ratio of the input received signal (S101 and S102). A concept of determination in S103 is shown in FIG. 10. FIG. 10A shows a case where it is determined that there is no rainfall. FIG. 10B shows a case where it is determined that there is rainfall. In S103, the threshold checker 10*b* compares a threshold and the maximum value of the S/N ratio input from the maximum value calculator 10*a*, and determines that there is rainfall when the maximum value of the S/N ratio≤the threshold. In this case, the processing proceeds to S104. In the other case, it is determined that there is no rainfall. In this case, the processing proceeds to S001, and the basic operation shown in FIG. 7 is performed only to cool the heat-generating portion 6*h*.

In S104, in a case where the information indicating that there is rainfall, is output from the threshold checker 10*b*, the elapse time checker 10*c* monitors whether the rainfall state continues for a predetermined time period, thereby confirming whether or not the rainfall. A concept of the determination in S104 is shown in FIG. 11. FIG. 11A shows a case where it is determined that there is no rainfall in a case where a ratio that the maximum value of the S/N ratio exceeds the threshold within a predetermined time period is equal to or greater than a predetermined ratio. FIG. 11B shows a case where it is determined that there is rainfall in a case where the ratio that the maximum value of the S/N ratio exceeds the threshold within the predetermined time period is smaller than the predetermined ratio.

In a case where the information from the elapse time checker 10*c* indicates that there is no rainfall, the air-blowing-amount determiner 11 proceeds to S001 and performs the basic operation shown in FIG. 7 only to cool the heat-generating portion 6*h*. Unless the temperature of the heat-generating portion 6*h* exceeds the threshold, which is a temperature at which it is not necessary to perform the cooling, a command not to operate the blower part 5 is output, and in a case where the temperature exceeds the threshold, a command to operate the blower part 5 is output to the blower controller 8.

Also, in a case where the information from the elapse time checker 10*c* indicates that there is rainfall, the air-blowing-amount determiner 11 outputs a command to operate the blower part 5, irrespective of the temperature of the heat-generating portion 6*h*. However, before the output, the temperature of the heat-generating portion 6*h* is acquired in S001. Then, in S112 (air blowing amount determining step), in a case where the foreign matter is detected in the foreign matter detecting step, the air-blowing-amount determiner 11 compares the preset air blowing amount of the blower part 5 for each temperature corresponding to the temperature detected in the temperature detecting step and the preset air blowing amount of the blower part 5 upon the detection of foreign matter and determines the larger air blowing amount. Then, according to an instruction from the air-blowing-amount determiner 11 based on a result of the determination, the blower controller 8 outputs an operation command or an instruction to change an air volume to the blower part 5.

After the blower control step in the air blowing method to the light transmission member, an air blowing step of instructing the blower part 5 to blow the air of the air volume determined by the air-blowing-amount determiner 11 and blowing the air from the nozzle opening 4 by the blower part 5 on the basis of the instruction is performed, so that it is possible to remove the foreign matter on the light transmission part 3. The air blowing method to the light transmission member may include the air blowing step.

Meanwhile, in this application, since a relation between the air volume required to cool the heat-generating portion 6*h* and the air volume required to remove the water droplet is set to 'air volume upon maximum heat generation>air volume for removing water droplet', the processing steps of S001 and S002 may be executed before S101, as shown in a flowchart of FIG. 12. In this way, the processing of S001 and S002 is performed in advance, so that the starting of the cooling of the heat-generating portion 6*h* can be made earlier. In a case where the air volume upon maximum heat generation is less than the air volume for removing water droplet, the processing of the flowchart shown in FIG. 12 may be executed.

Here, the air blowing method to the light transmission member is summarized. In the step (S101) of reading the S/N ratio data, the S/N ratio data is read. Regarding the input S/N ratio data, a maximum value of the S/N ratio data received in the maximum value calculating step (S102) is calculated. Then, the processing proceeds to the threshold checking step (S103), and the threshold and the maximum value of the S/N ratio data are compared, and in the case of 'S/N ratio maximum value≤threshold', the processing proceeds to the elapse time checking step (S104), and in the case of 'S/N ratio maximum value>threshold', the processing proceeds to the temperature information receiving step (S001), and the air blowing amount determining step 1 (S002) is executed. Meanwhile, in the elapse time checking step (S104), in the case where a ratio that 'maximum value≤threshold' is satisfied is equal to or more than the predetermined ratio within the predetermined time period, the processing proceeds to the temperature information receiving step (S001) in which the temperature information (temperature of the heat-generating portion 6*h*) is received, and proceeds to the air blowing amount determining step 2 (S112). The processing of step S112 is as described above.

(B) Operations in a Case where Optical Device is Imaging Device

Subsequently, a case where the optical device is an imaging device is described with reference to FIGS. 8B, 13 and 14. In the case of the imaging device, the foreign matter detecting step is to detect the foreign matter from the image signal obtained by the imaging device. That is, the foreign matter is detected from an image. The imaging device has a mechanism configured to remove the water droplet attached on the light transmission part 3, which is a lens or a lens protection plate, by the wind used for air cooling the heat-generating portion 6*h* of the observation unit 6. The electronic device casings 6*e* having the mechanism of the fins 7*f* are fitted to the frames of both sides of the central hollow space of the casing 1, so that a space is formed between the two electronic device casings 6*e*. The air taken by the blower part 5 is enabled to flow into the space, so that the heat-generating portion 6*h* is cooled. Also, the wind speed of the received air is increased by reducing the cross-sectional area of the nozzle opening 4 and the air is blown to the light transmission part 3, so that the water droplet, the snow and the like can be removed.

The operations of cooling the heat-generating portion 6*h* of the imaging device and removing the foreign matter on the light transmission part 3 are shown in a flowchart of FIG. 13. First, in S201, the image processor 10*d* receives an image signal (image data) from the imaging element 6*c*. Then, in S202, the image processor 10*d* image-processes the image signal and sends an image or a motion picture image to the foreign matter determiner 10*e*. The foreign matter determiner 10*e* determines a shape of a target, a distance to the target and the like from the image or motion picture image to determine whether or not the foreign matter.

In a case where the information from the foreign matter determiner 10e indicates that there is no foreign matter, the air-blowing-amount determiner 11 proceeds to S001 and executes the basic operation shown in FIG. 7 only to cool the heat-generating portion 6h. Unless the temperature of the heat-generating portion 6h exceeds the predetermined threshold, which is a temperature at which it is not necessary to perform the cooling, a command not to operate the blower part 5 is output to the blower controller 8, and in a case where the temperature exceeds the threshold, a command to operate the blower part 5 is output to the blower controller 8.

Also, in a case where the information from the elapse time checker 10c indicates that there is foreign matter, the air-blowing-amount determiner 11 outputs a command to operate the blower part 5, irrespective of the temperature of the heat-generating portion 6h. However, before the output, the temperature of the heat-generating portion 6h is acquired in S001. Then, in S112 (air blowing amount determining step), in a case where the foreign matter is detected in the foreign matter detecting step, the air-blowing-amount determiner 11 compares the preset air blowing amount of the blower part 5 for each temperature corresponding to the temperature detected in the temperature detecting step and the preset air blowing amount of the blower part 5 upon the detection of foreign matter and determines the larger air blowing amount. Then, according to an instruction from the air-blowing-amount determiner 11 based on a result of the determination, the blower controller 8 outputs an operation command or an instruction to change an air volume to the blower part 5.

Meanwhile, in this application, since the relation between the air volume required to cool the heat-generating portion 6h and the air volume required to remove the foreign matter is set to 'air volume upon maximum heat generation>air volume for removing foreign matter', the processing steps of S001 and S002 may be executed before S201, as shown in a flowchart of FIG. 14. In this way, the processing of S001 and S002 is performed forward, so that the starting of the cooling of the heat-generating portion 6h can be made earlier. In a case where the air volume upon maximum heat generation is less than the air volume for removing foreign matter, the processing of the flowchart shown in FIG. 14 may be executed.

The foreign matter detector 10 may be configured to be a pressure sensor and the like provided on the light transmission part 3 itself, instead of the configuration where the foreign matter attached on the light transmission part 3 is detected from the information about the light incident to the observation unit 6 from the outside through the light transmission part 3. Also, the foreign matter detector 10 may be configured to be a detection sensor provided at the outside of the casing 1. In the foreign matter detecting step in the air blowing method to the light transmission member, the foreign matter attached on the light transmission part 3 may be detected from the information from the pressure sensor provided on the light transmission part 3 or the information from the detection sensor provided at the outside of the casing 1, instead of the configuration where the foreign matter attached on the light transmission part 3 is detected from the information about the light incident to the observation unit 6 from the outside through the light transmission part 3.

Also, in a case where the film heater 3f is added to the optical device, when the film heater 3f operates due to the external air temperature outside the casing 1, the air-blowing-amount determiner 11 may make a determination of removing the foreign matter (water droplet), irrespective of the determination of the foreign matter detector 10. Thereby, before the observation by the observation unit 6 is made, the water droplets, which are formed as the ice and the like are melted by the heat of the film heater 3f, can be blown out. Also, in a case where the optical device is not provided with the film heater 3f, before the observation by the observation unit 6 is made, for example, upon the startup of the observation unit 6, the air is blown to the light transmission part 3 from the nozzle opening 4, irrespective of the determination of the foreign matter detector 10 or without performing the determination of the foreign matter detector 10. Thereby, in a case where the foreign matter is attached on the light transmission part 3 before the observation by the observation unit 6 is made, it is possible to blow out the foreign matter in advance and to perform the observation by the observation unit 6 smoothly. In other words, the optical device may be configured to blow the air to the light transmission part 3 from the nozzle opening 4 upon the startup thereof. At this time, the air volume is enough to blow out the foreign matter attached on the light transmission part.

A method of blowing the air to the light transmission part 3 from the nozzle opening 4 upon the startup is described. In a case where the film heater 3f is provided, the air blowing method to the light transmission method includes a film heater ON/OFF determining step of determining whether the film heater 3f is on (activated)/off (stopped), as a first step. In a case where the film heater 3f is OFF, the processing proceeds to S101, S201 or S001. In a case where the film heater 3f is ON, the processing proceeds to an air blowing step, i.e., a melted water droplet removing step. The air blowing step for removing the melted water droplet is performed by the blower part 5 under control of the signal processor 6s and the blower controller 8, like the air blowing step of blowing the air with the instructed air volume. After that, the processing of S101, S201 or S001 is executed. In a case where the film heater 3f is not provided, the air blowing method to the light transmission method includes the air blowing step (which is also referred to as an air blowing step upon the startup or a foreign-matter-removing step upon the startup), as a first step. The air blowing step upon the startup is also executed by the blower part 5 under control of the signal processor 6s and the blower controller 8, like the air blowing step for removing the melted water droplet.

In a case where the optical device is installed at a place distant from a house, the bird and/or animal may cause damage to the optical device. In this case, the optical device has a structure configured to generate a loud sound when blowing the air from the nozzle opening 4, and an effect that the bird and/or animal avoid the optical device can be expected. In a case where a whistle function is added to the nozzle opening 4, the louder sound upon the blowing of the air can be generated. Therefore, the effect that the bird and/or animal avoid the optical device can be improved further. Also, a tone may be changed by changing the air volume temporally. At this time, the air volume is required not to be smaller than the air volume necessary for the removing the foreign matter on the light transmission part 3 or the cooling of the heat-generating portion 6h. Therefore, in a case where changing the air volume, it is necessary to set the air volume necessary for the removing the foreign matter on the light transmission part 3 or the cooling of the heat-generating portion 6h, as the smallest air volume. In particular, the air volume is required not to be less than the air volume necessary for the cooling of the heat-generating portion 6h.

Therefore, in a case where the air blowing step of blowing the air from the nozzle opening 4 by the blower part 5 is added after the blower control step in the air blowing method to the light transmission member, it is possible to cause the bird and/or animal to avoid the optical device. In this case, the air blowing step can be referred to as a bird and/or animal avoiding step. It is assumed that the damage caused by the bird and/or animal includes the excrement from small animals such as birds and insects. The bird and/or animal avoiding step may be executed, irrespective of whether the foreign matter is attached on the light transmission part 3 and separately from the cooling of the heat-generating portion 6h. Also in this case, the bird and/or animal avoiding step is performed by the blower part 5 under control of the signal processor 6s and the blower controller 8.

As described above, since the heat-generating portion 6h is not exposed, the optical device of the first illustrative embodiment can also be used as an outdoor application. Also, the air that is used for the cooling and heat exhaust is used effectively by using other than for the heat exhaust. In the meantime, according to Patent Literature 5, it is necessary to form a port in the casing to introduce the air from the outside of the casing to the inside of the casing, and to configure a structure where the outside of the casing and the inside of the casing communicate with each other. For example, the technology of Patent Literature 5 cannot be applied to a casing that is installed at a place such as the sea where the salt water is applied directly. Also, the fan is used only for the cooling, and the loss of the energy consumed in the entire casing is not reduced.

Also, according to Patent Literature 3, the inside of the casing and the outside of the casing are separated. However, the fin is not exposed to the outside, only the atmospheric temperature in the casing is lowered, and the cooling of the high heat source is not considered as a problem. The optical device of the first illustrative embodiment is targeted for an observation unit and a plurality of high heat-generating electronic device casings for controlling the observation unit and can solve at least two contradictory problems such as a waterproof/airtight structure, weight saving, long lifespan, low power consumption and the like in a unit where the using of the powerful cooling fan is premised.

According to the optical device of the first illustrative embodiment, a casing structure resistant to external environments such as rainwater, seawater and snow is provided, and an electronic device configured to be used continuously is provided with a cooling means. Thereby, the exhaust heat air, which has been used only for the cooling, can be used for removing the rain or snow attached on the casing 1. The fins 7f are arranged on an outer side of the airtight structure, that is, a hollow space formed in the casing 1, which is a feature of the optical device of the first illustrative embodiment, and the airtight part is separated by the hollow structure, so that it is possible to cool the plurality of electronic casings with the waterproof structure being kept and it is possible to use the exhaust heat air after the cooling for the removing the rain or snow. In the related art, only the observation unit is accommodated in the waterproof airtight casing, which is arranged at an outdoor place, and the separated electronic device is used at an indoor place. According to the optical device of the first illustrative embodiment, the multiple electronic devices can be arranged to exhaust heat, and it is possible to implement the miniaturization and the power saving in the observation unit of which observation result is influenced by a change in the outside natural environment.

According to the optical device of the first illustrative embodiment, the observation unit casing has the observation unit accommodated therein and the electronic devices for controlling the observation unit therein and has the waterproof/airtight structure for protecting the observation unit from the change in the outdoor environmental conditions. The observation unit has the light transmission part 3 on the wall surface of the casing 1, the hollow structure, which is configured to cool the electronic devices by the heat transfer with the external air and the internal air being insulated, is configured in the casing, and the fins 7f attached to the outside of the waterproof/airtight structure of the observation unit, the duct 4d configured to discharge the wind generated by the blower part 5 to the light transmission part 3 of the observation unit and the door (cover 1c) configured to be opened and closed for maintenance of the internal electronic devices are provided on the casing.

The duct of the optical device according to the first illustrative embodiment has an opening diameter smaller than that of the opening of the blower part 5 so as to accelerate the wind generated by the blower part 5 for, upon the discharge, the purpose of removing the foreign matter such as dust and water droplet attached on the light transmission part 3.

The lidar device is a kind of the meteorological radar. In a Doppler lidar system configured to measure wind directions and wind speeds from the ground to the sky by using a laser light, the water and snow attached on the light transmission part 3 deteriorate considerably the observation performance because the laser light is blocked. In the related art, the attached water and/or snow are removed by the wiper. However, while the wiper is moving, the light is blocked, the light transmission part 3 is damaged, and a maintenance interval is shortened because of the endurance of the wiper rubber. Also, in a case where the rainwater, the snow and the like are attached on the light transmission part 3, the emitted laser light is blocked, so that the observation performance is degraded remarkably. The lidar device is configured to blow out the foreign matter such as the water droplet and snow on the light transmission part 3 by the wind force, so that it is possible to solve the problem that the observation cannot be performed due to the foreign matter.

Second Illustrative Embodiment

A structure of the optical device according to a second illustrative embodiment is described with reference to FIGS. 15 and 16. FIG. 15 is a configuration view (a plan view, a cross-sectional view) of the optical device according to the second illustrative embodiment of the present disclosure. FIG. 16 is a cross-sectional view illustrating a flow path of the optical device according to the second illustrative embodiment of the present disclosure.

Figure 15A:
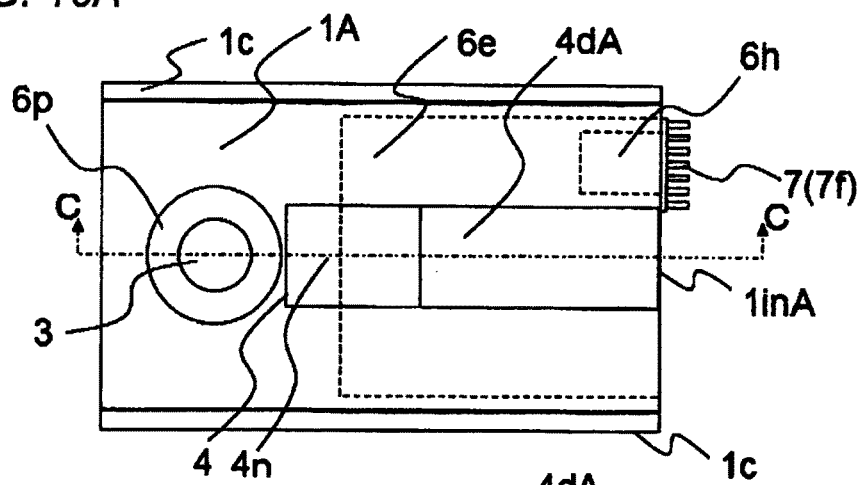
FIGS. 15A and 15B are configuration views (a plan view, a cross-sectional view) of an optical device according to a second illustrative embodiment of the present disclosure.
Figure 15B:
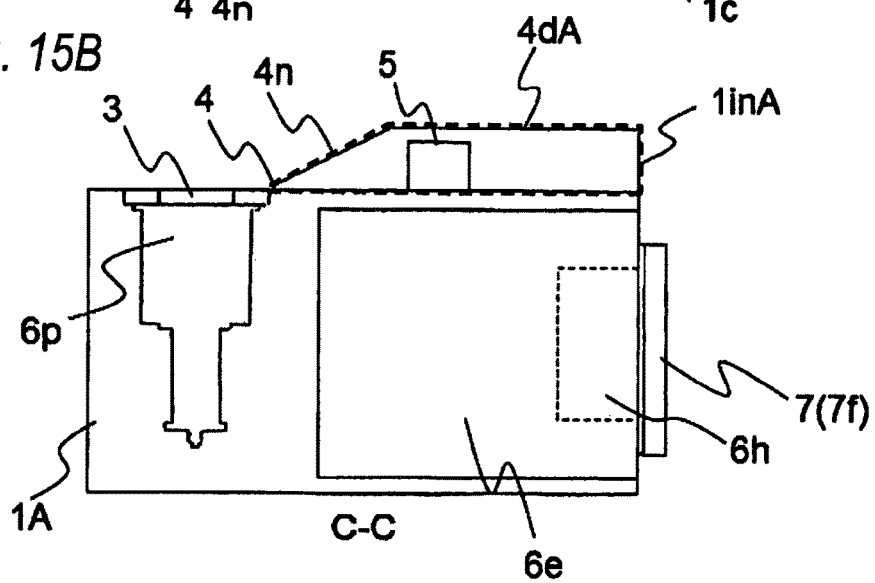
Figure 16:
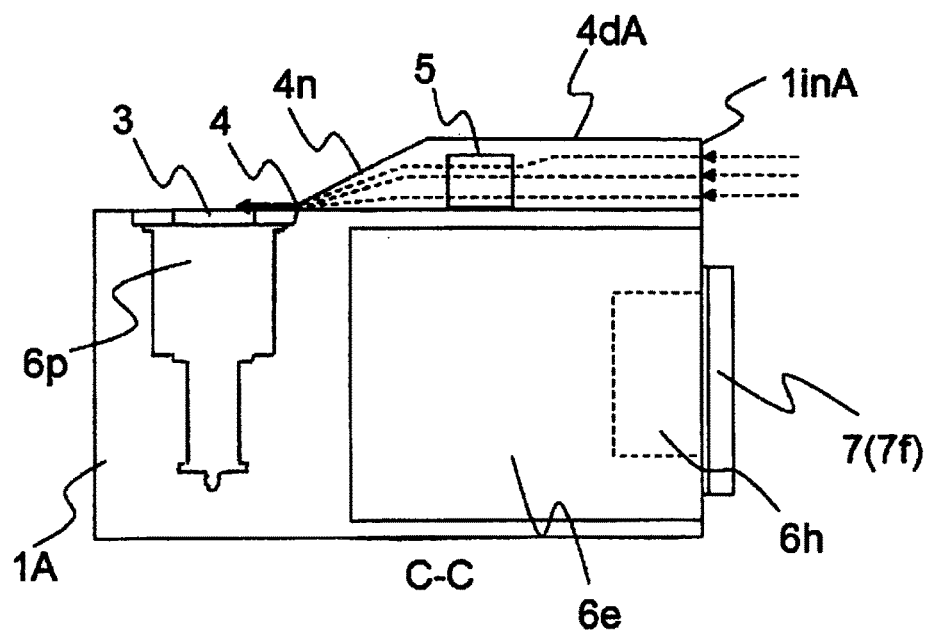
FIG. 16 is a cross-sectional view illustrating a flow path of the optical device according to the second illustrative embodiment of the present disclosure.

FIG. 15A is a plan view of the optical device, FIG. 15B is a cross-sectional view of the optical device along a line C-C of FIG. 15A, and FIG. 16 illustrates the air flow in the C-C cross-sectional view of the optical device of FIG. 15A.

In FIGS. 15 and 16, a casing 1A has a cuboid box-shaped outer shape and a waterproof/airtight structure. The light transmission part 3 is made of a material through which the light can transmit, such as a lens, a transparent plate and the like made of glass or resin, and is an observation window provided on the casing 1. A duct 4dA arranged on the upper surface of the casing 1A is a flow path of the air for blowing the air sucked through an air intake port 1in A to the light transmission part 3 through the nozzle opening 4. Specifically, the duct 4dA is provided with the nozzle 4n of which cross-sectional area of the flow path is decreased gradually as it becomes closer to the nozzle opening 4, which is an air blow port. By the nozzle 4n, it is possible to accelerate and blow the exhaust air (air) from the flow path.

In FIGS. 15 and 16, an opening area of the air intake port 1in A is set to be larger than an opening area of the nozzle opening 4. A filter may be provided in the air intake port 1in A. The blower part 5 is configured to generate the air flow from the air intake port 1in A to the nozzle opening 4, which is an air blow port, and is provided in the duct 4dA. In the drawings of this application, the nozzle opening 4 and air intake port 1in A are arranged to face each other, and the air flow in the duct 4dA is substantially linear. The duct 4dA may be bent downwardly in the vicinity of the air intake port 1in A to bend the flow path so that the air intake port 1in A faces downwards.

According to the optical device of the second illustrative embodiment, the exhaust air (air) of the air sucked from the air intake port 1in A is accelerated at the nozzle 4n and is discharged to the light transmission part 3 through the duct 4dA. In this way, by using the kinetic energy of the exhaust air flow for the cleaning of the light transmission part 3, the optical device can be used sustainably. The exhaust air is discharged onto the light transmission part 3 through the duct 4dA. The air introduced from the air intake port 1in A is accelerated to the speed based on the Bernoulli's theorem because the opening area of the nozzle opening 4 is made to be smaller than other parts. Thus, it is possible to blow out the foreign matter such as water droplets resulting from rain and snow and dust on the light transmission part 3 by the exhaust air stream, so that it is possible to clean the light transmission part 3 without using a person's hand.

Also in the second illustrative embodiment, the flow path for blowing the air for removing the foreign matter on the light transmission part 3 is formed with maintaining the waterproof structure of the casing.

The heat-generating portion 6h of the observation unit 6 is small, as compared to the first illustrative embodiment, and the fin 7f is exposed to the outside of the casing 1A and is cooled by the natural air cooling. The fin may be provided in the flow path so that the air having cooled the fin 7f can be used so as to blow out the foreign matter. A part of the flow path in which the fin is provided may be a part passing through the interior side of the casing, rather than the outside of the casing, or may be other parts.

Although the casing has the cuboid shape, the casing may be a polyhedron of which sides are inclined. A casing having any shape may be used inasmuch as it is a casing having a waterproof or airtight structure and a light transmission part provided thereto and an air flow path for blowing the air so as to remove the foreign matter attached on the light transmission part can be formed with maintaining the waterproof or airtight structure.

The above can be applied to other illustrative embodiments.

DESCRIPTION OF REFERENCE NUMERALS 1, 1A: casing
1in, 1in A: air intake port
1c: cover
2: through flow path
3: light transmission part (light transmission member)
3f: film heater
4: nozzle opening (air blow port)
4d, 4dA: duct
4n: nozzle
5: blower part
6: observation unit
6h: heat-generating portion
6sc: scanner
6rt: optical transmitter-and-receiver
6s: signal processor
6c: imaging element
6p: optical unit casing
6e: electronic device casing
6es: electronic device substrate
6eh: electronic device circuit (heat-generating member)
7: cooler
7f: fin
8: blower controller
9: temperature detector
10: foreign matter detector
10a: maximum value calculator
10b: threshold checker
10c: elapse time checker
10d: image processor
10e: foreign matter determiner
11: air-blowing-amount determiner

The invention claimed is:

1. An optical device comprising:
a casing having a waterproof structure;
a light transmitter provided on the casing;
an air blow port to blow air to the light transmitter;
a flow path through which the air flows to the air blow port and which is formed to maintain the waterproof structure of the casing and has a through flow path that is a part being outside of the casing and passing through an interior side of an outer shape of the casing;
an air intake port, through which the air flows into the flow path;
a blower to generate an air flow from the air intake port to the air blow port;
an observation device accommodated in the casing and configured to receive light from an outside through the light transmitter; and
a cooler to cool a heat-generating portion of the observation device, the cooler including fins to transfer heat from the heat-generating portion to air in the through flow path.

2. The optical device according to claim 1, wherein a cross-section of the through flow path perpendicular to a flowing direction of the air is rectangular, and
the heat-generating portion of the observation device is arranged at least one side of long sides of the rectangle.

3. The optical device according to claim 2, wherein the cooler includes the fins extending from both of the long sides facing each other of the rectangular cross-section of the through flow path.

4. The optical device according to claim 2, wherein the light transmitter is arranged at a short side of the rectangle that is the cross-section of the through flow path.

5. The optical device according to claim 1, wherein a film heater is provided on the light transmitter.

6. The optical device according to claim 1, further comprising a heat pipe to transfer the heat from the heat-generating portion of the observation device to the fins.

7. The optical device according to claim 1, wherein the heat-generating portion of the observation device forms a part of a wall surface of the through flow path that maintains the waterproof structure of the casing.

8. The optical device according to claim 7, wherein the fins are provided on the heat-generating portion of the observation device.

9. An imaging device that is the optical device according to claim 1, wherein the observation device comprises:
an imaging element, and
a signal processor configured to execute signal processing for an image signal obtained by the imaging element.

10. The optical device according to claim 1, wherein the casing has a waterproof and airtight structure, and
the flow path is formed to maintain the waterproof and airtight structure of the casing.

11. An optical device comprising:
a casing having a waterproof structure;
a light transmitter provided on the casing;
an air blow port to blow air to the light transmitter;
a flow path through which the air flows to the air blow port and which is formed to maintain the waterproof structure of the casing and has a through flow path, which is a part being outside of the casing and passing through an interior side of an outer shape of the casing;
an air intake port, through which the air flows into the flow path;
a duct that covers a first opening that is an opening of the through flow path on a first surface on which the light transmitter is provided, and through which the air flows from the first opening to the air blow port;
a blower to generate an air flow from the air intake port to the air blow port, the blower being arranged between the first opening and the air blow port in the duct;
an observation device accommodated in the casing and configured to receive light from an outside through the light transmitter; and
a cooler to cool a heat-generating portion of the observation device, the cooler including a fin provided in the through flow path and configured to transfer heat from the heat-generating portion to air in the through flow path.

12. The optical device according to claim 11, wherein the first opening and the other opening of the through flow path are arranged respectively on two facing surfaces of the casing having a cuboid outer shape.

13. The optical device according to claim 11, wherein an area of the first opening is smaller than a cross-sectional area of the through flow path of a part at which the fin of the cooler is provided.

14. The optical device according to claim 11, wherein the air blow port is provided on the duct.

15. The optical device according to claim 14, wherein the duct has a nozzle of which cross-sectional area is reduced gradually as proceeding toward the air blow port.

16. The optical device according to claim 15, wherein the nozzle is provided at a part of the duct facing from the blower towards the air blow port.

17. The optical device according to claim 11, wherein the casing has a waterproof and airtight structure, and
the flow path is formed to maintain the waterproof and airtight structure of the casing.

18. An optical device comprising:
a casing having a cuboid outer shape and a waterproof structure;
a light transmitter provided on a first surface of the casing;
an air blow port to blow an air to the light transmitter;
a through flow path for ventilation being outside of the casing and penetrating the casing to a first opening formed on the first surface and having a rectangular cross-section formed to maintain the waterproof structure;
an air intake port that is an opening formed on a second surface facing the first surface and through which the air flows into the flow path;
a duct that covers the first opening and through which the air flows to the air blow port and which is provided on the casing;
a flow path that has the through flow path and the duct and through which the air flows from the air intake port to the air blow port;
a blower to generate an air flow from the air intake port to the air blow and provided between the first opening and the air blow port in the duct;
an observation device accommodated in the casing and configured to receive light from an outside through the light transmitter, and the observation device including heat-generating portions arranged to face each other at long sides of the rectangular cross-section of the through flow path, and
a cooler to cool the heat-generating portions, the cooler including fins extending respectively from both of the long sides facing each other of the rectangular cross-section of the through flow path and to transfer heat from the heat-generating portions of the observation device to air in the through flow path,
wherein the duct has a nozzle, of which cross-sectional area is reduced gradually as proceeding toward the air blow port at a part from a set position of the blower towards the air blow port.

19. A lidar device that is the optical device according to claim 1, wherein the observation device comprises:
a scanner configured to irradiate the outside with a transmission light and to receive a reflected light that is reflection of the irradiated transmission light through the light transmitter;
an optical transmitter-and-receiver to execute transmission and reception processing for transmission light transmitted by the scanner and the reflected light received by the scanner; and
a signal processor to calculate a wind speed on the basis of the reflected light received and processed by the optical transmitter-and-receiver.

20. The optical device according to claim 18, wherein the casing has a waterproof and airtight structure, and
the through flow path is formed to maintain the waterproof and airtight structure of the casing.

* * * * *